US012597965B1

(12) United States Patent
Rofougaran et al.

(10) Patent No.:  US 12,597,965 B1
(45) Date of Patent:       Apr. 7, 2026

(54) WIRELESS COMMUNICATION DEVICE AND METHOD FOR ADAPTIVE RF SPECTRUM ANALYSIS

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Beach, CA (US); Milan Rofougaran, Newport Coast, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 19/353,721

(22) Filed: Oct. 9, 2025

(51) Int. Cl.
  *H04B 7/0417*        (2017.01)
  *H04W 24/02*        (2009.01)
(52) U.S. Cl.
  CPC .......... *H04B 7/0417* (2013.01); *H04W 24/02* (2013.01)
(58) Field of Classification Search
  CPC ........................... H04B 7/0417; H04W 24/02
  See application file for complete search history.

(56) References Cited

U.S. PATENT DOCUMENTS

| | | | | |
|---|---|---|---|---|
| 10,116,264 B1 * | 10/2018 | Gutman | ................... | H03F 3/19 |
| 10,374,728 B1 * | 8/2019 | Derat | .................... | H04B 17/19 |
| 2005/0227619 A1 * | 10/2005 | Lee | ...................... | H04B 7/2606 455/22 |
| 2006/0013287 A1 * | 1/2006 | Normark | ................. | G01S 19/29 375/E1.003 |
| 2009/0088082 A1 * | 4/2009 | Sigmund | ............... | H01Q 21/24 455/39 |
| 2011/0077886 A1 * | 3/2011 | Suk | ....................... | H04W 24/10 324/76.19 |
| 2012/0027055 A1 * | 2/2012 | Lang | .................. | H04B 7/18515 375/316 |
| 2013/0065513 A1 * | 3/2013 | Bourrouillou | ..... | H04B 7/18513 455/9 |

(Continued)

*Primary Examiner* — Steven S Kelley
(74) *Attorney, Agent, or Firm* — CHIP LAW GROUP

(57)                ABSTRACT
A wireless communication device includes a processor configured to set a plurality of operational parameters to process digitized down-converted signals, where the digitized down-converted signals are input signals in a plurality of different intermediate frequency bands. The processor processes the digitized down-converted signals across a plurality of distinct signal domains and extracts one or more domain-specific features from each signal domain of the plurality of distinct signal domains. The processor further generates a fused feature vector for each intermediate frequency band from the extracted one or more domain-specific features of each signal domain. The processor further determines one or more signal patterns based on generated fused feature vector for each intermediate frequency band. The processor further generates feedback data based on the determined one or more signal patterns and processing of performance metrics of the wireless communication device and adjusts the operational parameters based on the generated feedback data.

19 Claims, 8 Drawing Sheets

(56)         References Cited

U.S. PATENT DOCUMENTS

2014/0079098 A1* 3/2014 Harjani ............... H04B 7/0837
                                              375/219
2015/0093995 A1* 4/2015 Gilbert .............. H04B 7/18517
                                              455/63.1
2016/0273957 A1* 9/2016 Bendele ................ G01H 1/003
2016/0309352 A1* 10/2016 Yuan ................ H02J 13/00034
2017/0339578 A1* 11/2017 Brommer ........... H04L 27/0012

* cited by examiner

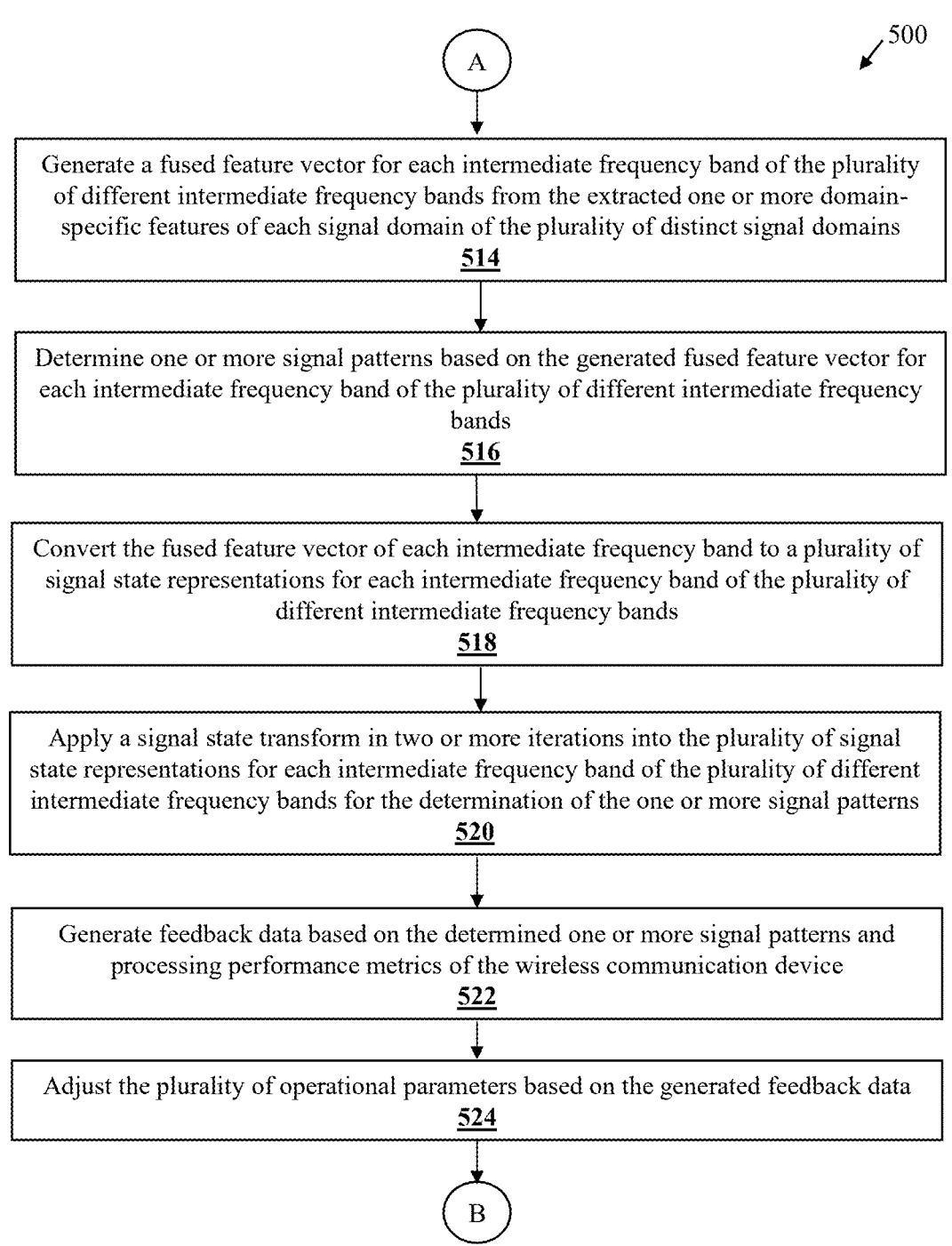

A

Generate a fused feature vector for each intermediate frequency band of the plurality of different intermediate frequency bands from the extracted one or more domain-specific features of each signal domain of the plurality of distinct signal domains
514

Determine one or more signal patterns based on the generated fused feature vector for each intermediate frequency band of the plurality of different intermediate frequency bands
516

Convert the fused feature vector of each intermediate frequency band to a plurality of signal state representations for each intermediate frequency band of the plurality of different intermediate frequency bands
518

Apply a signal state transform in two or more iterations into the plurality of signal state representations for each intermediate frequency band of the plurality of different intermediate frequency bands for the determination of the one or more signal patterns
520

Generate feedback data based on the determined one or more signal patterns and processing performance metrics of the wireless communication device
522

Adjust the plurality of operational parameters based on the generated feedback data
524

WIRELESS COMMUNICATION DEVICE AND METHOD FOR ADAPTIVE RF SPECTRUM ANALYSIS

CROSS-REFERENCE TO RELATED APPLICATIONS/INCORPORATION BY REFERENCE

None.

FIELD OF TECHNOLOGY

Certain embodiments of the disclosure relate to wireless communication devices and spectrum monitoring systems. More specifically, certain embodiments of the disclosure relate to a wireless communication device and a method for adaptive radio frequency (RF) spectrum analysis.

BACKGROUND

The rapid growth of wireless communication technologies and the increasing demand for high-bandwidth applications have led to significant challenges in the current spectrum management landscape. It is known that radio monitoring is the basis of spectrum management. Spectrum monitoring helps spectrum regulators to plan and use frequencies, avoid incompatible usage, and identify sources of harmful interference. It is a growing problem due to the growing number of RF spectrum uses. Equipment such as spectrum analyzers are useful tools for analyzing and monitoring radio frequency (RF) signals. These instruments are useful for wireless communications testing, ensuring regulatory compliance, and troubleshooting RF interference. Spectrum analyzers play vital roles in RF design, testing, and electronic circuit development. Conventional spectrum analyzers, while effective to a certain extent, face several limitations. Currently, there are many technical challenges in effective spectrum monitoring and signal analysis across multiple frequency bands in increasingly congested electromagnetic environments. For example, high-end analyzers capable of monitoring frequencies up to 80+ GHz can cost between $1-2 million per unit, with even lower frequency models (4-5 GHZ) ranging from $15,000-50,000. This significant cost barrier prevents widespread deployment of spectrum monitoring systems, particularly in applications requiring multiple monitoring points.

Current spectrum analysis solutions generally fall into two categories: swept and real-time analyzers. Swept analyzers operate by sequentially scanning frequency ranges, introducing deadtime between sweeps that can miss intermittent signals. Real-time analyzers offer faster acquisition but require complex and expensive hardware for concurrent Fast Fourier Transform (FFT) processing. Both approaches typically demand dedicated hardware for different frequency bands, further increasing system complexity and cost. These limitations become particularly problematic in modern wireless environments characterized by, for example: (a) increasing spectrum congestion from proliferating wireless devices; (b) growing deployment of autonomous systems requiring reliable communication; (c) need for reliable interference detection and mitigation; (d) requirements for spatial awareness and signal source location; and (e) complex signal environments requiring advanced pattern recognition. With conventional systems, while traditional software-defined radio (SDR) solutions offer more flexibility, they often have restricted frequency spans and insufficient processing capability for advanced signal analysis. Additionally, conventional analyzers struggle with limited spatial awareness, making it difficult to locate and characterize signal sources in complex environments. In another example, there is a form factor constraint with traditional systems used for spectrum monitoring. Traditional benchtop units require significant space whole portable units sacrifice functionality for mobility. Furthermore, current systems typically process each frequency band in isolation, creating detection gaps for sophisticated signals like frequency-hopping transmitters or coordinated multi-band jammers.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A wireless communication device and a method for adaptive radio frequency (RF) spectrum analysis, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF DRAWINGS

FIGS. 5A, 5B and 5C collectively, is a flowchart of a method for adaptive RF spectrum analysis, in accordance with an embodiment of the disclosure.

DETAILED DESCRIPTION OF THE DISCLOSURE

Figure 1:
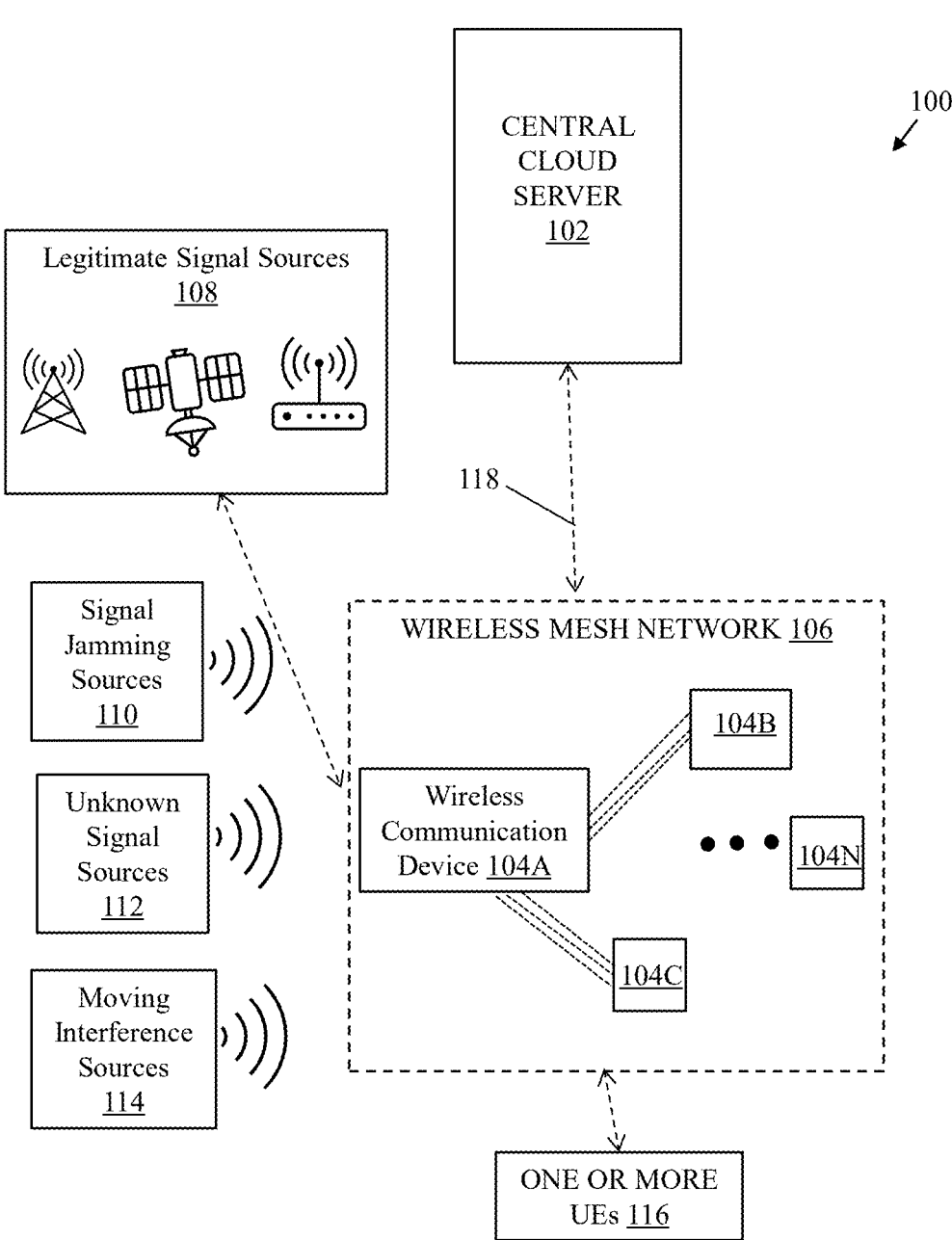
FIG. 1 is a diagram that illustrates an exemplary system for adaptive radio frequency (RF) spectrum analysis, in accordance with an exemplary embodiment of the disclosure.

Certain embodiments of the disclosure may be found in a wireless communication device and a method for adaptive radio frequency (RF) spectrum analysis.

Conventional wireless spectrum monitoring systems face significant limitations when analyzing signals across multiple frequency bands. Current systems typically process each frequency band in isolation, creating detection gaps for sophisticated signals like frequency-hopping transmitters or coordinated multi-band jammers. The inability to synchronize processing across bands limits cross-band correlation capabilities, which in turn prevents accurate detection of related signal patterns spanning multiple bands. Additionally, most existing systems use static operational parameters that may not adapt to dynamic RF environments, resulting in either missed detections or excessive false alarms as conditions change. The conventional systems further lack efficient methods for fusing spectral, temporal, spatial, and polarization domain features, limiting their ability to characterize complex signals comprehensively. These limitations are particularly problematic in congested RF environments where interference and legitimate signals must be accurately distinguished across multiple bands.

In contrast to conventional systems and devices, the disclosed wireless communication device and method achieves adaptive RF spectrum analysis through intelligent integration of operations, such as initial setting of operational parameters, multi-domain signal processing, generation of a fused feature vector, determination of signal patterns across multiple intermediate frequency bands based on the fused feature vector, and adjustment of the set operational parameters based on feedback data. For example, by setting operational parameters, the wireless communication device may achieve superior signal processing across expanded frequency spectrum (e.g., 2.4 GHz, 5 GHZ, and/or 6 GHz bands). The multi-domain processing (e.g., spectral, temporal, spatial, and polarization domains) may provide a more comprehensive signal determination than traditional systems. The multi-dimensional analysis may uncover signal characteristics that would remain hidden in single-domain approaches, significantly improving the ability to identify and classify complex signals in crowded signal environments (e.g., Wi-Fi 7® and 5G mm Wave environments). Further, the generation of the fused feature vector may create a synergistic effect where the combined information from multiple domains may yield insights that exceed the sum of individual domain analyses. The generation of the fused feature vector may improve signal identification accuracy, particularly for complex signals with distinctive characteristics distributed across different domains, enabling the detection of signal patterns with improved accuracy. Furthermore, the adjustment of the operational parameters based on the feedback data may enable the wireless communication device 104A to continuously refine and improve its processing capabilities. Furthermore, the determination of the signal patterns across the multiple intermediate frequency bands may enable the detection of sophisticated signals that may perform concurrent operation across different frequency ranges. The capability of determination of the signal patterns across the multiple intermediate frequency bands may be helpful in identifying MLO operations and distinguishing them from interference sources affecting multiple bands, which may be useful to maintain reliable connectivity in next-generation wireless networks. Finally, the targeted parameter adjustments based on specific performance metrics may enable efficient allocation of processing resources, optimize power consumption and improve computational efficiency compared to systems that apply excessive processing resources uniformly across all signal types.

Furthermore, conventional systems and devices (e.g. conventional spectrum analyzers) manifest hardware complexity, such as multiple dedicated radio frequency (RF) front ends for different frequency bands, expensive analog-to-digital converters (ADCs) for high-bandwidth signal capture (e.g., >7 GHZ), and complex signal processing hardware driving high spectrum analyzer costs. In contrast to conventional systems and devices (e.g. conventional spectrum analyzers) requiring dedicated hardware for different frequency bands, embodiments herein advantageously utilize commercial WLAN chipsets (e.g., IEEE 802.11be chipset and modems) with intelligent signal down conversion and signal processing architectures to achieve wide frequency range coverage (DC to 300 GHz) in a cost-effective manner.

FIG. 1 is a diagram that illustrates an exemplary network environment of a system for adaptive radio frequency (RF) spectrum analysis, in accordance with an exemplary embodiment of the disclosure. With reference to FIG. 1, there is shown a system 100 for enhanced spectrum sensing across multiple frequency bands. The system 100 may include a central cloud server 102, a plurality of wireless communication devices, such as wireless communication devices 104A, 104B, 104C, . . . , 104N. In an implementation, the wireless communication devices 104A, 104B, 104C, . . . , 104N may be interconnected with each other in a wireless mesh network 106. In another implementation, each of the wireless communication devices 104A, 104B, 104C, . . . , 104N may function independently as a standalone device for enhanced spectrum sensing across multiple frequency bands or may work in cooperation with each other for not only enhanced spectrum sensing across multiple frequency bands but also wireless data communication and routing across the wireless mesh network 106.

There are further shown different types of signal sources, such as legitimate signal sources 108, signal jamming sources 110, unknown signal sources 112, and moving interference sources 114. The legitimate signal sources 108, for example, may be authorized and licensed wireless carrier network frequencies, for example, 4G or 5G signals from base stations or small cells, frequencies used for direct-to-cell service (e.g., satellite-to-cell phone service), or authorized wireless local area network (WLAN) signals (e.g., Wi-Fi® signals), or other legitimate commercial or non-commercial RF signals, as per use case. The wireless communication devices 104A, 104B, 104C, . . . , 104N may not be initially aware of the different types of signal sources and may perform RF signal (airwaves) scanning to detect and identify active signal sources and potential receivers operating on specific frequencies within range. In an implementation, the wireless communication devices 104A, 104B, 104C, . . . , 104N may be further communicatively coupled to the central cloud server 102, via a communication network 118.

The central cloud server 102 includes suitable logic, circuitry, and interfaces that may be configured to communicate with the wireless communication devices 104A, 104B, 104C, . . . , 104N (may also be referred to as network nodes or a mesh nodes). In an implementation, the central cloud server 102 may be communicatively coupled to each network node including the one or more user equipment (UEs) 116. In an example, the central cloud server 102 may be a remote management server that is managed by a third party different from the service providers associated with the plurality of different wireless carrier networks (WCNs), service providers or spectrum owners. In another example, the central cloud server 102 may be a remote management server or a data center that is managed by a third party, or jointly managed, or managed in coordination and association with one or more of the plurality of different WCNs or different service providers.

The wireless communication devices 104A, 104B, 104C, . . . , 104N may also be referred to as mesh nodes when connected to each other in the wireless mesh network 106. Each of the wireless communication devices 104A, 104B, 104C, . . . , 104N, may be configured to capture and monitor raw RF signals from direct current (DC, i.e. 0 hertz (Hz)) to 300 Gigahertz (GHz) and analyze the captured RF signals. Each of the wireless communication devices 104A, 104B, 104C, . . . 104N may be a multi-functional device for spectrum-sensing across a plurality of frequency bands (DC to 300 GHz) as well as wireless data communication to one or more other wireless communication devices in the wireless mesh network 106. Examples of the wireless communication devices 104A, 104B, 104C, . . . , 104N, may include but is not limited to a wide-range spectrum monitoring device or a special dual-purpose device for spectrum sensing and wireless data communication, a modified repeater device, or a 5G backplane system.

The wireless mesh network 106 may be a resilient, high-capacity wireless network that extends the reach of a fiber backbone to provide widespread coverage to end users, such as the one or more UEs 116 via the wireless communication devices 104A, 104B, 104C, . . . , 104N. The fiber backbone (not shown) may be a high-performance, fiber-optic core network infrastructure that connects central offices, data centers, and the wireless mesh network 106. The fiber backbone may aggregate traffic from the central offices and data centers and provide seamless integration between the fiber and wireless network components.

The legitimate signal sources 108 may refer to authorized transmitters operating within licensed frequency bands in compliance with regulatory standards and predetermined protocols. Examples of the legitimate signal sources may include, but not limited to, cellular base stations, small cells, or repeaters, Licensed FM/AM radio stations, commercial broadcast transmitters, public safety communications, satellite downlinks, authorized military communications within designated bands (if that is required in a use case), authorized Wi-Fi® signals, GPS satellites operating at 1575.42 MHz, and licensed point-to-point microwave links (e.g., cellular backhaul links operating at Jun. 11, 2018/23 GHz or other bands, financial trading networks using 70/80 GHz E-band, Broadcast studio-to-transmitter links (STL), for example, at 950 MHz, utility Supervisory Control and Data Acquisition (SCADA) networks operating at 4/6 GHZ, enterprise building-to-building connections at 60 GHZ, or public safety backhaul networks at 4.9 GHZ, or Internet service provider backbone links).

The signal jamming sources 110 may refer to devices deliberately emitting interference signals designed to disrupt or degrade wireless communications across single or multiple frequency bands. Examples of the signal jamming sources may include, but not limited to, GPS jammers, cellular blockers (e.g., multi-band jammers (GSM/CDMA/3G/4G/5G), Frequency hopping cell disruptors, Band-specific blockers (700 MHz/850 MHz/1900 MHz), Smart jammers targeting control channels, or Base station signal overriders), broadband noise generators, targeted frequency disruptors, and pulsed interference systems.

The unknown signal sources 112 may refer to transmitters producing RF emissions that do not conform to known signal characteristics, protocols, or authorized frequency allocations. Examples of the unknown signal sources may include, but not limited to, unidentified transmitters, non-standard modulation signals, encrypted transmissions of unknown origin, sporadic unauthorized emissions, and signals using uncharacterized protocols.

The moving interference sources 114 may refer to mobile entities generating RF interference that change spatial location over time, whether intentional or unintentional. Examples of the moving interference sources may include, but not limited to, vehicles with malfunctioning electronics, mobile jamming platforms, interference-generating drones, vessels with non-compliant radio systems, and portable unauthorized transmitters in motion.

The one or more UEs 116 may correspond to a wireless communication device, such as a client device or telecommunication hardware used by an end-user to communicate. Some of the one or more UEs 116 may refer to a combination of a mobile equipment and subscriber identity module (SIM). Examples of the one or more UEs 116 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

The communication network 118 may refer to the infrastructure and protocols enabling secure data exchange between the wireless communication devices 104A, 104B, 104C, . . . , 104N and the central cloud server 102 through one or more known wireless transmission mediums.

The various operations of the disclosed system 100 may be explained by taking an example of one wireless communication device, such as the wireless communication devices 104A. It is to be understood that operations described for the wireless communication device 104A may be applicable to other wireless communication devices 104B, 104C, . . . , 104N. For example, each of the wireless communication devices 104A, 104B, 104C, . . . , 104N may be configured to perform wideband spectrum monitoring with high sensitivity and dynamic range while intelligently utilizing the processing capabilities of a commercial WLAN chipset (e.g., IEEE 802.11be chipset and modems) modified for signal monitoring with intelligent signal down conversion and signal processing architectures to achieve wide frequency range coverage (DC to 300 GHz) in a cost-effective manner.

Typically, IEEE 802.11be/ax (Wi-Fi® 7/6E) hardware is conventionally designed for high-throughput wireless networking, operating in 2.4 GHz, 5 GHZ, and 6 GHz bands. It provides features like multi-link operation (MLO), 320 MHz channels, 4K Quadrature Amplitude Modulation (QAM) modulation, and multi-user Multiple-Input Multiple-Output (MIMO) primarily for data communication between access points and client devices.

The present disclosure intelligently modifies and repurposes IEEE 802.11be/ax hardware beyond its standard networking role by integrating wideband spectrum monitoring capabilities. In an example, the wireless communication device 104A may leverage the hardware's advanced signal processing capabilities while extending frequency coverage from DC to 300 GHZ through multi-stage conversion (otherwise primary coverage is only frequency range of 1-7 GHZ and that too not for spectrum monitoring purpose). This adaptation enables concurrent operation as a wireless networking device and a spectrum monitoring platform, utilizing features like MLO and high-speed signal processing for signal detection, classification, and analysis across a significantly broader range than traditional Wi-Fi® operations. The wireless communication device 104A maintains networking functionality in the system 100 while adding capabilities for detecting different types of signal sources, such as legitimate signal sources 108, signal jamming sources 110, unknown signal sources 112, and moving interference sources 114.

In an implementation, multiple monitoring nodes, such as the wireless communication devices 104B, 104C, . . . , 104N, may operate concurrently across different frequency bands. In such a case, each node may perform local analysis, and the data is then sent to a central fusion center, such as the central cloud server 102, for real-time processing and combining. This distributed operation may further allow for enhanced spatial coverage, improved jammer resistance through diversity, and scalable deployment while maintaining high-resolution analysis capabilities.

Beneficially, each of the wireless communication devices 104A, 104B, 104C, 104N intelligently modifies and repurposes IEEE 802.11be/ax hardware beyond its standard networking role by combining generation of a fused feature vector and determination of signal patterns across multiple intermediate frequency bands based on the fused feature vector. The generation of the fused feature vector may improve signal identification accuracy, particularly for complex signals with distinctive characteristics distributed across different domains, enabling the detection of sophisticated transmission operations employed in modern wireless systems. Furthermore, the determination of the signal patterns across the multiple intermediate frequency bands may enable the detection of sophisticated signals that may perform concurrent operation across different frequency ranges. The capability of determination of the signal patterns across the multiple intermediate frequency bands may be used in identification of multi-link operation (MLO) operations and distinguishing them from interference sources affecting multiple bands. The adjustment of the operational parameters based on the feedback data may enable the wireless communication device 104A to continuously refine and improve its processing capabilities.

Figure 2:
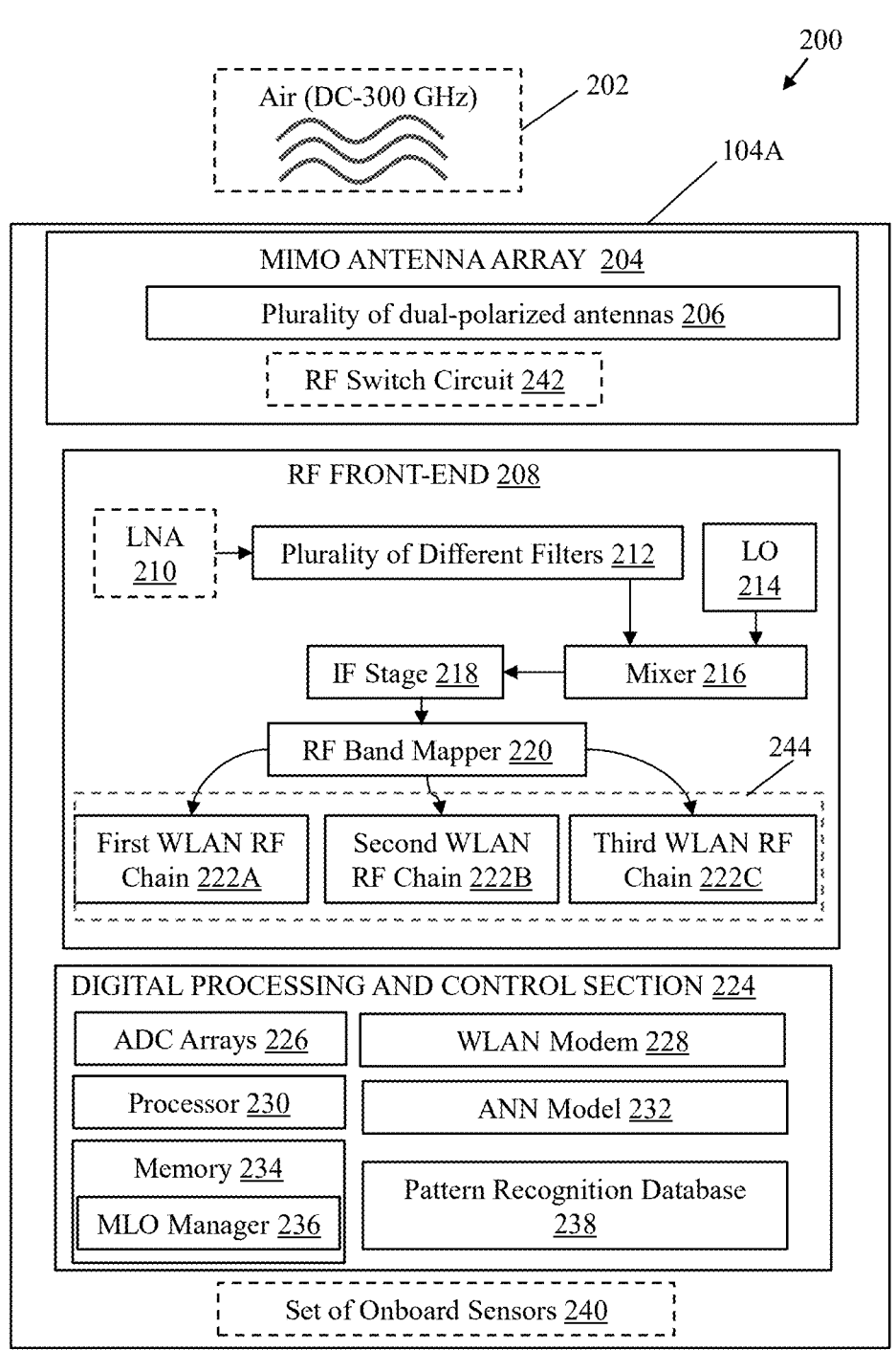
FIG. 2 is a block diagram that illustrates various components of an exemplary wireless communication device for adaptive RF spectrum analysis, in accordance with an exemplary embodiment of the disclosure.

FIG. 2 is a block diagram that illustrates various components of an exemplary wireless communication device for adaptive radio frequency (RF) spectrum analysis, in accordance with an exemplary embodiment of the disclosure. FIG. 2 is explained in conjunction with elements from FIG. 1. With reference to FIG. 2, there is shown a block diagram 200 of the wireless communication devices 104A.

The wireless communication devices 104A may include an antenna array system, such as a multiple-input-multiple-output (MIMO) antenna array 204. The MIMO antenna array 204 may include a plurality of dual-polarized antennas 206. In an implementation, the antenna array system, such as the MIMO antenna array 204 may include a radio frequency (RF) switch circuit 242. The wireless communication devices 104A may include an RF front-end 208 and a digital processing and control section 224.

The RF front-end 208 may include a Low-Noise Amplifier (LNA) 210, a plurality of different filters 212, a local oscillator 214, a mixer 216, an intermediate frequency (IF) stage 218, an RF band mapper 220, a WLAN radio (e.g., an IEEE 802.11be radio) comprising distinct RF chains for concurrent operations across different frequency bands, such as a first WLAN radio chain 222A (e.g., RF chain 1 for 2.4 GHz band processing), a second WLAN radio chain 222B (e.g., RF chain 2 for 5 GHz band processing), and a third WLAN radio chain 222C (e.g., RF chain 3 for 6 GHz band processing). Each chain may comprise dedicated components (LNA, mixers, filters) optimized for its specific frequency band, enabling concurrent multi-band operation (not shown for the sake of brevity).

The digital processing and control section 224 may be configured to handle digital processing (e.g., analog to digital conversions, digital signal processing, multi-link operations (MLO) processing, baseband processing etc.,), WLAN modem functions, as well as system control functions (e.g., a system on a chip (Soc)). The digital processing and control section 224 may include ADC arrays 226, a WLAN modem 228, a processor 230, an artificial neural network (ANN) model 232, a memory 234 with an MLO manager 236, and a pattern recognition database 238. In an implementation, the wireless communication devices 104A may further include a set of onboard sensors 240.

The MIMO Antenna Array 204 may include the plurality of dual-polarized antennas 206 configured to receive radio frequency signals in vertical and horizontal polarizations across the plurality of frequency bands, for example, ranging from direct current (DC) to 300 GHz. The MIMO Antenna Array 204 may incorporate dedicated MIMO elements for 2.4/5/6 GHz Wi-Fi® bands and wideband elements for full spectrum coverage enabling comprehensive spectrum sensing capabilities across multiple frequency bands (i.e., not only supports primary coverage from 1-7 GHz but manifest extended range capability to DC-300 GHz through multistage conversion operations).

The RF front-end 208 may be configured to apply band-specific filtering operation to the received radio frequency signals to isolate signals-of-interest with at least 50-80 decibels of spurious signal suppression. In an implementation, the RF front-end 208 may maintain a noise figure below 3 decibels and phase noise performance of −110 dBc/Hz at 10 kHz offset with dynamic range exceeding 90 decibels. The RF front-end 208 may comprise low noise amplification stages, pre-filtering components, first stage mixing with local oscillator, and initial intermediate frequency stage processing.

The RF band mapper 220 may be configured to perform mapping of received radio frequency signals to predefined intermediate frequencies (e.g., 2.4 GHZ, 5 GHZ, or 6 GHz). The RF band mapper 220 may enable concurrent processing of signals across multiple frequency bands. The RF band mapper 220 may perform demultiplexing of signals into WLAN bands (Wi-Fi® bands) and provide dedicated signal paths for 2.4/5/6 GHz processing with multi-stage frequency conversion.

The ADC arrays 226 may refer to analog-to-digital converter arrays configured to digitize the down-converted signals for processing. The WLAN modem 228 may refer to a wireless local area network modem configured to handle baseband signal processing, including digital processing operations such as Fast Fourier Transform (FFT)/Inverse Fast Fourier Transform (IFFT), signal equalization, Medium Access Control (MAC) layer processing, and Quality of Service (QoS) management.

The processor 230 may be configured to execute spectrum analysis, signal classification, and cross-band correlation across multiple intermediate frequency bands (e.g., 5 GHz and 6 GHz). The processor 230 may be part of Soc and may incorporate one or more processing units including Central Processing Unit (CPU), Neural Processing Unit (NPU), and Digital Signal Processor (DSP) for specialized signal processing tasks.

The memory 234 may refer to a storage configured to store processing data and signal patterns. The memory 234 may provide hierarchical memory architecture for efficient data access and processing. Examples of implementation of the memory 234 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The MLO manager 236 may refer to a multi-link operation manager configured to control concurrent processing across multiple frequency bands and manage system interfaces for coordinated operation.

The pattern recognition database 238 may refer to a database system configured to maintain historical signal correlation patterns and update correlation thresholds based on pattern recognition results, enabling adaptive learning and pattern evolution tracking.

The set of onboard sensors 240 refers to environmental and operational sensors configured to provide supplementary data to support signal classification and threat assessment capabilities, where the sensors enable enhanced contextual awareness for signal processing decisions. For example, the set of onboard sensors 240 may include one or more image sensors, a lidar sensor, a Radar, a spatial position sensor, an inertial measurement unit (IMU) sensor, and a temperature sensor. A wide range of sensors may be integrated or connected to enrich each wireless communication device 104A with environmental awareness for intelligent intra-node and inter-node optimizations. For example, the one or more image sensors may be used to visually monitor the surroundings of each network node. The lidar sensor may be referred to as light detection and ranging sensors used to enable accurate three-dimensional (3D) profiling and depth perception of surroundings of each network node for precise beam alignment. The Radar may be a built-in radar to detect and track motion to monitor movement patterns of surrounding objects and predict potential RF signal blockers. The spatial position sensor may be a global navigation satellite system (GNSS) sensor, such as global positioning system (GPS) to provide location awareness for each network node used for geospatial analytics and positioning capabilities. The IMU sensor may include a combination of accelerometers, gyroscopes, and magnetometers (sometimes magnetometers may not be used) that typically measures the body's specific force, angular rate, and orientation of a given body. In this case, such raw IMU output may be processed to measure node vibrations, shocks, and orientation changes at each network node.

The RF switch circuit 242 may refer to a radio frequency switch circuit configured to route signals between multiple antenna elements with switching time less than 100 microseconds and frequency step size of 100 kHz. The RF switch circuit 242 may enable rapid transitions between frequency bands for continuous spectrum monitoring. In an implementation, the RF switch circuit 242 may be configured to perform dynamic beam steering by switching between different phased antenna arrays installed at different positions around the wireless communication device 104A to route RF signals along different directions as required. This enables adaptable signal propagation, responding to changing network conditions and optimizing communication paths for improved reliability and performance.

In operation, the MIMO antenna array 204 that comprises the plurality of dual-polarized antennas 206 may be configured to receive radio frequency (RF) signals in vertical and horizontal polarizations across a plurality of frequency bands. In FIG. 2, the RF signals in the air captured by the MIMO antenna array 204 may be represented by wavy lines (i.e., the airwave 202). In an example, the MIMO antenna array 204 may be a 4×4 MIMO array. In an implementation, the MIMO antenna array 204 may be an antenna array system that may include one or more wide array antennas and may provide 360° coverage pattern. In an implementation, the MIMO antenna array 204 may include four independent antenna elements with different phases (0°, 90°, 180°, 270°). The MIMO antenna array 204 may be configured to receive multiple independent data streams concurrently on different antennas, effectively increasing capacity without requiring more bandwidth and when receiving the same signal from different antennas may provide diversity gain to combat fading and improve signal reliability. Further, the plurality of dual-polarized antennas 206 are configured to enhance signal reception and improve spectral efficiency by capturing RF signals in both vertical and horizontal polarizations across multiple frequency bands. For example, each antenna element within the MIMO antenna array 204 may be equipped with orthogonally oriented dipoles or patch radiators that are capable of concurrently receiving RF signals in both vertical and horizontal polarization planes. In this case, since each antenna element may support two independent polarization modes (vertical and horizontal), the combination of MIMO with dual polarization effectively doubles the data communication capacity without increasing bandwidth or frequency usage. Further, as the plurality of dual-polarized antennas 206 allow two independent communication channels per antenna, the need for additional physical antennas is reduced, which may be useful for space-limited applications for compact antenna design and contribute to portability of the wireless communication device 104A. The combination of the MIMO feature with the dual-polarized antennas allows the wireless communication device 104A to capture signals from multiple spatial points and enhances detection accuracy with full polarization coverage for all types of transmissions. This helps detect hidden, weak, or non-line-of-sight (NLOS) signals, useful in crowded RF environments.

In accordance with an embodiment, the plurality of frequency bands captured by the MIMO antenna array 204 may range from DC to 100 gigahertz (GHz). In other words, the wireless communication device 104A may perform a real-time, wide-band spectrum monitoring across frequencies ranging from DC to 100 GHz with high resolution (for example, down to about 19 kHz). In accordance with an embodiment, the plurality of frequency bands captured by the MIMO antenna array 204 may range from direct current (DC) to 300 gigahertz (GHz). The wireless communication device 104A may be a multi-function device for adaptive RF spectrum analysis as well as wireless data communication to one or more other wireless communication devices 104B, 104C, . . . , 104N in the wireless mesh network 106. In other words, each network node functions as both a spectrum analyzer and a high-speed communication endpoint.

In accordance with an embodiment, the RF front-end 208 coupled to the MIMO antenna array 204, may be configured to apply band-specific filtering operation to the received RF signals to isolate signals-of-interest. The RF front-end 208 further may comprise the plurality of different filters 212 for the band-specific filtering operation of the received RF signals for the isolation of the signals-of-interest along with at least 50-80 decibels (dB) of spurious signal suppression. In an implementation, the LNA 210 may be placed before pre-filtering stage, as spectrum monitoring may often involve detecting weak or distant signals (e.g., covert transmissions, military radar, low-power IoT devices). Further, to sniff RF signals from the airwave 202, especially the broad frequency range (e.g., DC-100 GHZ), the LNA 210 first approach ensures that signals across all frequencies are captured with minimal loss before band-specific filtering operation. The LNA 210 may amplify such weak signals before they encounter any filtering losses, improving detection accuracy. In some implementations, the LNA 210 may not be placed before the plurality of different filters 212 to reduce out-of-band interference. The wireless communication device 104A may opt for both options of LNA 210 first or without LNA 210 alternatively to see if there is any difference in spectrum monitoring results for enhanced analysis.

In an example, the plurality of different filters 212 may be pre-filters that may process signals across distinct frequency ranges, where low band filtering may operate from 50 MHz to 1 GHz to eliminate interference from TV, FM, and LTE signals, mid band filtering may operate from 1 GHz to 3 GHz to suppress cellular and adjacent Wi-Fi® bands, and high band filtering may operate from 3 GHz to 100 GHz and above to isolate high-frequency signals from 5G, radar, and millimeter-wave sources. In an implementation, the RF front-end 208 may employ a multi-stage filtering architecture that may include cavity filters providing high-Q resonance, Surface Acoustic Wave (SAW) filters, and Bulk Acoustic Wave (BAW) filters for precise frequency selectivity. In some implementation, the wireless communication device 104A may implement an adaptive digital filtering operation using DSP-based notch filters after the analog filtering stage, which may enhance the overall spurious signal rejection capabilities. Further, the implementation of narrowband bandpass filters may enable selective passing of signals-of-interest while maintaining substantial attenuation of unwanted RF signals, wherein the multi-stage spurious suppression operations may achieve 50-80 dB of rejection. This comprehensive filtering operation may be particularly advantageous in dense RF environments where multiple interfering signals may be present, enabling the system to effectively isolate and monitor specific frequency bands of interest while maintaining high signal quality through robust interference suppression.

In accordance with an embodiment, the RF front-end 208 may be further configured to down-convert and digitize the isolated signals-of-interest to predefined intermediate frequencies to obtain digitized down-converted signals. In an implementation, the RF front-end 208 may employ the mixer 216 and the LO 214 configuration, where the mixer 216 may combine the filtered RF signals with the LO-generated stable frequency to produce sum and difference frequencies. The difference frequency (RF-LO frequency) may be selected as the desired intermediate frequency (IF), such as 5 GHZ, 6 GHZ, or 7 GHz while the sum frequency may be discarded. In this case, the IF selection may be predetermined ensuring compatibility with subsequent digitization hardware (e.g., the IEEE 802.11be chipset, such as the WLAN radio 244 and the WLAN modem 228). The down-conversion to predefined intermediate frequencies allows the wireless communication device 104A to leverage, for example, the IEEE 802.11be chipset's processing architectures, reducing hardware complexity, while re-purposing for enhanced spectrum monitoring as well as wireless data communication. The down-converted IF signals may then be processed through an Analog-to-Digital Converter (ADC) that may sample and convert the analog IF signals into digital form. Further, the selection of predefined intermediate frequencies may be specifically configured to avoid interference from other signals while matching ADC bandwidth and resolution requirements. This down-conversion and digitization operation may enable advanced digital signal processing capabilities, including real-time filtering, demodulation, and pattern recognition, which may be particularly beneficial for spectrum monitoring applications requiring signal classification, anomaly detection, and cognitive RF adaptation for interference mitigation.

In accordance with an embodiment, the radio frequency (RF) front-end 208 may be further configured to perform an RF mapping of the received RF signals in the plurality of frequency bands to one of the predefined intermediate frequencies corresponding to a first intermediate frequency band or a second intermediate frequency band. The first intermediate frequency band may be different from the second intermediate frequency band. Each of the predefined intermediate frequencies corresponding to the first intermediate frequency band and the second intermediate frequency band is one of: 2.4 GHZ, 5 GHZ, 6 GHZ, 7 GHZ, or other unlicensed or Industrial, scientific, and medical (ISM) frequency band. The RF band mapper 220 may be configured to demultiplex the obtain digitized down-converted signals in the predetermined intermediate frequencies (e.g., a common intermediate frequency or one or more predetermined intermediate frequencies) into different WLAN frequency bands (e.g., 2.4 GHZ, 5 GHz, and 6 GHZ) and may assign dedicated paths for efficient processing. The frequency mapping may ensure that the signals are optimally allocated and processed based on resource availability. Based on the resource status, the best IF band assignment out of the different WLAN frequency bands may be done. Once the RF mapping is complete, the digitized down-converted signals signal may then be processed.

In an example, the RF mapping may incorporate channel and spatial mapping capabilities, wherein each frequency band may be divided into distinct channels, and spatial mapping may be performed to optimize beamforming and interference management. The wireless communication device 104A may implement a resource allocation mechanism that may dynamically check available resources and perform load balancing across the 2.4/5/6 GHz bands based on congestion levels. Further, the RF front-end 208 may assign dedicated processing paths to the different WLAN frequency bands, where the signals may undergo specific filtering, mixing, and digitization processes based on predefined IF mapping configurations. In other words, the RF front-end 208 may assign to the WLAN radio 244 (e.g., an IEEE 802.11be radio) comprising distinct RF chains for concurrent operations across different frequency bands, such as the first WLAN radio chain 222A (e.g., RF chain 1 for 2.4 GHz band processing), the second WLAN radio chain 222B (e.g., RF chain 2 for 5 GHz band processing), and the third WLAN radio chain 222C (e.g., RF chain 3 for 6 GHz band processing). Each chain may comprise dedicated components (LNA, mixers, filters) optimized for its specific frequency band, enabling simultaneous multi-band operation. This comprehensive RF mapping operation may enable efficient spectrum utilization and optimal signal processing, particularly beneficial for next operation of implementing Multi-Link Operation (MLO) that may require dynamic frequency assignment across multiple bands while maintaining minimal interference and maximum processing efficiency.

In accordance with an embodiment, the processor 230 may be configured to set a plurality of operational parameters to process digitized down-converted signals. The digitized down-converted signals may be input signals in a plurality of different intermediate frequency bands. In an implementation, the processor 230 may initialize a set of plurality of operational parameters at the wireless communication device 104A prior to digital signal processing. The plurality of operational parameters may determine how the processor 230 processes incoming digitized signals that have been down-converted from their original RF frequencies to various intermediate frequency (IF) bands. The plurality of operational parameters may comprise two or more of: radio frequency (RF) front-end parameters, signal processing parameters, multiple-input-multiple-output (MIMO) parameters, multi-link operation (MLO) parameters, domain-specific feature extraction parameters, or signal pattern classification parameters.

In accordance with an embodiment, the RF front-end parameters of the plurality of operational parameters may be filter bandwidths, gain settings, or noise floor thresholds, configured to optimize initial signal reception across multiple IF bands. The RF front-end parameters may comprise specific configurations useful to optimize multi-band signal reception in the wireless communication device 104A (e.g., a Wi-Fi® 7 integrated device). The filter bandwidths may be initially configured for each intermediate frequency band (2.4 GHZ, 5 GHZ, and 6 GHZ) with appropriate channel widths (20/40/80/160/320 MHz) to isolate signals of interest while rejecting out-of-band interference. The gain settings may control signal amplification throughout the RF chain, including Low Noise Amplifier (LNA) gain (10-30 dB), Variable Gain Amplifier (VGA) settings (0-40 dB), and Automatic Gain Control (AGC) parameters, which may be set to ensure adequate signal strength for processing while preventing saturation or distortion. The noise floor thresholds may establish detection sensitivity levels, including baseline noise floor measurements, detection thresholds (typically 6-10 dB above noise floor), and adaptive threshold parameters for dynamic environments. These parameters may influence signal reception and may require proper initialization before digital signal processing begins, with subsequent fine-tuning based on real-time performance feedback to maintain optimal system performance across varying RF environments.

In accordance with an embodiment, the signal processing parameters of the plurality of operational parameters may include sampling rates, window functions, and Fast Fourier Transform (FFT) sizes that may be specifically tailored to the characteristics of each IF band. The signal processing parameters may be configurations that determine how digitized signals arc analyzed across different intermediate frequency bands in the wireless communication device 104A. The sampling rates may define the frequency of analog signal measurement during analog-to-digital conversion, for example, requiring 80-160 Million Samples per second (MSps) for 2.4 GHz band, 200-400 MSps for 5 GHz band, and 400-640 MSps for 6 GHz band with 320 MHz channels, selected to satisfy the Nyquist criterion to prevent aliasing. The window functions, including Hamming (general analysis), Blackman (high dynamic range), and Rectangular (transient detection), may shape how signal segments are analyzed, providing essential trade-offs between frequency resolution and spectral leakage. The FFT sizes may determine frequency resolution and processing granularity, ranging from smaller sizes (512-1024 points) for faster processing, medium sizes (2048-4096 points) for balanced operation, to larger sizes (8192-16384 points) for high-resolution analysis of complex signals. These parameters may be configured initially based on expected signal characteristics and operational requirements to optimize detection sensitivity, frequency resolution, and discrimination between legitimate signals and interference, all while being subject to adaptive optimization during system operation.

In accordance with an embodiment, the multiple-input-multiple-output (MIMO) parameters of the plurality of operational parameters may include configurations that govern spatial signal processing in the wireless communication device 104A equipped with multiple antenna arrays, such as the MIMO antenna array 204. The MIMO parameters may include beamforming weights, including phase coefficients (0-360° with sub-degree resolution), amplitude weights (0-1 normalized values), and update rates (1-10 ms), which collectively may determine how signals from multiple antennas combine to enhance reception in specific directions. The null steering parameters that may include null depth specifications (20-40 dB of suppression), angular width configurations (5-20° depending on selectivity requirements), and maximum simultaneous null count (typically 1-3 for 4×4 MIMO) may also be part of the MIMO parameters, which may control the wireless communication device's 104A ability to mitigate spatial interference. Spatial correlation thresholds, including correlation coefficient thresholds (0.7-0.9), spatial diversity gain settings (3-10 dB), and angle of arrival precision parameters (5-15° resolution), may establish criteria for identifying spatially related signals. These parameters may be initially configured to establish baseline spatial processing capabilities before the system 100 adaptively optimizes them during operation, thereby enabling enhanced signal detection, effective interference mitigation, and accurate direction-finding capabilities useful for comprehensive spectrum monitoring in complex RF environments.

In accordance with an embodiment, the multi-link operation (MLO) parameters of the plurality of operational parameters may correspond to configurations that may enable synchronized operation across multiple frequency bands in Wi-Fi® 7 chipset integrated device, like the wireless communication device 104A. The MLO parameters may include band synchronization timing (with precision typically <1 μs), cross-band coordination settings (controlling link aggregation and load balancing across 2.4 GHZ, 5 GHZ, and 6 GHz bands), resource allocation priorities (determining which bands receive processing priority based on signal characteristics), timing reference selection (establishing primary and secondary timing sources), correlation windows (typically 1-10 ms for cross-band pattern detection), and link quality thresholds (SNR requirements of 15-25 dB for reliable operation). These MLO parameters may be initially configured to ensure time-aligned processing across bands, enabling useful capabilities such as cross-band correlation for detecting frequency hopping signals, coordinated interference detection across multiple bands, synchronous feature extraction, and coherent pattern recognition. The MLO configuration may influence the system's ability to detect and analyze sophisticated signals that operate across multiple frequency bands, significantly enhancing spectrum monitoring capabilities beyond what single-band systems can achieve.

In accordance with an embodiment, the domain-specific feature extraction parameters of the plurality of operational parameters may refer to configuration indicative of how signal characteristics are extracted and processed across spectral, temporal, spatial, and polarization domains in the wireless communication device 104A. The domain-specific feature extraction parameters may include feature selection settings that may determine the number of features processed (ranging from a full set of 64 features for comprehensive analysis to a reduced set of 32 features for balanced operation, or a minimum set of 16 features for efficient processing), with feature importance thresholds establishing prioritization (critical features with importance >0.8, important features >0.6, and optional features >0.4). The domain-specific feature extraction parameters may further include dimension reduction parameters that may control how the feature space is optimized, including Principal Component Analysis (PCA) component counts (maximum: 32 components for high-fidelity representation, standard: 16 components for normal operation, or minimum: 8 components for efficient processing) and variance retention settings (high: 95% for detailed analysis, normal: 90% for standard operation, or low: 85% for efficient processing). The domain-specific feature extraction parameters may be initially configured to establish how the wireless communication device 104A extracts meaningful information from raw signals while optimizing computational resources, directly impacting detection sensitivity, classification accuracy, and processing efficiency across multiple frequency bands, with subsequent adaptive optimization based on performance feedback.

In accordance with an embodiment, the signal pattern classification parameters of the plurality of operational parameters may refer to configurations that may determine how the wireless communication device 104A may identify, categorize, and respond to detected signal patterns across multiple frequency bands. The signal pattern classification parameters may include pattern matching thresholds (typically ranging from 70-95% for different confidence levels), classification confidence requirements (high confidence: >95%, medium confidence: >85%, low confidence: >75%), decision boundary configurations (controlling the sensitivity-specificity trade-off in signal categorization), learning rate settings (fast: 0.1, normal: 0.01, slow: 0.001) for adaptive pattern recognition, and database update frequencies (real-time: every detection, periodic: every 100 detections, batch: every 1000 detections). The signal pattern classification parameters may be initially configured to establish baseline pattern recognition capabilities, directly influencing ability to distinguish legitimate signals from interference, identify sophisticated transmission schemes such as frequency hopping patterns, recognize potential jamming signals, and classify unknown or anomalous signals requiring further analysis. The proper configuration of these parameters may ensure optimal classification performance while maintaining an appropriate balance between detection sensitivity and false alarm rates, with subsequent adaptive optimization based on operational feedback and evolving signal environments.

In accordance with an embodiment, the processor 230 may be further configured to process the digitized down-converted signals across a plurality of distinct signal domains. The plurality of distinct signal domains may comprise two or more of: a spectral domain, a temporal domain, a spatial domain, or a polarization domain. The spectral domain may process signal frequency components across multiple intermediate frequency bands, for example, using FFT analysis to identify sophisticated frequency patterns and cross-band correlations. The temporal domain may analyze signal behavior over time to detect timing patterns, packet sequences, and time-based correlations that span multiple bands. The spatial domain may be used to leverage the 4×4 MIMO array, such as the MIMO antenna array 204, with the plurality of dual-polarized antennas 206 to determine signal direction, create spatial nulls, and identify spatial signal characteristics. The polarization domain may be used to examine vertical and horizontal signal components from the plurality of dual-polarized antennas 206 to enhance signal classification and improve interference rejection capabilities. In an implementation, the processor 230 may analyze the digitized down converted signals across all four domains (e.g., spectral domain, temporal domain, spatial domain, or polarization domain) concurrently to extract signal characteristics. In an implementation, the processor 230 may perform domain specific (e.g. spectral domain, temporal domain, spatial domain, and polarization domain)

analysis for each domain sequentially or concurrently. For example, the processor 230 may perform spectral domain analysis by applying Fast Fourier Transform (FFT) operations to extract frequency components and power spectral densities across 320 MHz channels of Wi-Fi 7®. For temporal domain analysis, the processor 230 may analyze signal durations, packet sequences, and timing patterns to identify protocol-specific characteristics. In spatial domain processing, the processor 230 may utilize phase differences between MIMO antenna elements to determine direction-of-arrival and spatial signatures of signal sources. Concurrently, the processor 230 may conduct polarization domain analysis to examine vertical-horizontal polarization ratios and polarization states that help distinguish between signals with similar characteristics in other domains. The processor 230 may synchronize the domain-specific processing operations to ensure that analysis results correspond to the same time windows across all domains, which enables accurate correlation of features between multiple domains. The processing of the digitized down-converted signals across the plurality of distinct signal domains may allow the wireless communication device 104A to create signal patterns that capture characteristics which would remain undetected in conventional single-domain or dual-domain analysis systems.

In accordance with an embodiment, the processor 230 may be further configured to perform two or more of the spectral domain analysis, the temporal domain analysis, the spatial domain analysis, or the polarization domain analysis for each intermediate frequency band of the plurality of different intermediate frequency bands for the processing of the digitized down-converted signals across the plurality of distinct signal domains. In an example, for the spectral domain analysis, the processor 230 may determine frequency components and bandwidth utilization within 320 MHz channels of Wi-Fi 7®. In another example, for the temporal domain analysis, the processor 230 may examine signal variations over time, including packet durations and timing patterns that reveal protocol-specific behaviors. When performing the spatial domain analysis, the processor 230 may utilize the 4×4 MIMO antenna configuration to calculate direction-of-arrival information and spatial correlation coefficients of incoming RF signals. For the polarization domain analysis, the processor 230 may process signals from the dual-polarized antenna to determine polarization states and vertical-horizontal polarization ratios. The signal characteristics in one domain may appear ambiguous or contain noise, however, distinctive features in other domains provide additional discriminative information. For example, two Wi-Fi® 7 transmissions with similar spectral patterns may be distinguished by their spatial signatures or polarization states. The integration of all four domains may enable the wireless communication device 104A to identify and classify signals in a complex RF environment.

In an implementation, the processor 230 maybe further configured to analyze the digitized down-converted signals across plurality of distinct signal domains concurrently further based on configuration of the plurality of operational parameters, such as the front-end parameters, the signal processing parameters, the MIMO parameters, the MLO parameters, the domain-specific feature extraction parameters, or the signal pattern classification parameters. The processor 230 may be further configured to analyze the digitized down-converted signals across the plurality of signal domains concurrently by implementing concurrent processing pathways for spectral, temporal, spatial, and polarization domains based on the configured operational parameters. For example, the processor 230 may utilize the front-end parameters to optimize signal quality from a first quality level to a second quality level for each intermediate frequency band by applying the signal processing parameters to transform signals into domain-specific representations using appropriate sampling rates and FFT sizes. The processor 230 may leverage the MIMO parameters to extract spatial information from the MIMO antenna array 204 and may employ the MLO parameters to maintain synchronization across the 2.4 GHZ, 5 GHZ, and 6 GHZ bands. The processor 230 may perform domain-specific feature extraction parameters to identify relevant characteristics within each domain while the signal classification parameters may guide how these multi-domain features may be integrated for pattern recognition. This concurrent multi-domain analysis enables the processor 230 to detect complex signal relationships that span across frequency bands and signal domains, such as frequency-hopping patterns, spatially-directed interference, and sophisticated modulation schemes, providing comprehensive signal characterization capabilities beyond what sequential or isolated domain analysis may achieve.

In an example, the processor 230 may analyze the digitized down-converted signals across the plurality of signal domains based on the MLO parameters. The concurrent analysis may leverage the plurality of operational parameters previously configured in the wireless communication device 104A. For example, the front-end parameters (filter bandwidths, gain settings, noise floor thresholds) may establish the initial signal conditioning environment. The signal processing parameters (sampling rates, window functions, FFT sizes) may determine how raw signals are transformed into analyzable data. The MIMO parameters (beamforming weights, null steering, spatial correlation thresholds) may enable spatial domain analysis. The MLO parameters may provide synchronized operation across multiple frequency bands. The domain-specific feature extraction parameters may control how meaningful characteristics are identified in each domain. The signal pattern classification parameters may determine how detected patterns are categorized and interpreted. Thus, the concurrent analysis of the digitized down-converted signals across plurality of signal domains concurrently allows the processor to concurrently extract and correlate information across spectral, temporal, spatial, and polarization domains while maintaining synchronization across multiple frequency bands. By analyzing all domains concurrently rather than sequentially, the wireless communication device 104A may detect complex relationships between signal characteristics that would otherwise be missed, enabling identification of sophisticated signal patterns, cross-band correlations, and multi-domain interference signatures. This concurrent multi-domain analysis may represent a significant advancement over conventional systems that typically process domains or bands in isolation.

In an example, the MLO parameters may include buffer sizes for each Intermediate Frequency (IF) band that determine temporary data storage capacity (e.g., configured as powers of 2, like 4096 or 8192 samples), Fast Fourier Transform (FFT) window parameters (including window size, overlap percentage, and window function type) that control frequency resolution and processing accuracy, sampling rates for each Analog-to-Digital Converter (ADC) of the ADC arrays 226 that determine data acquisition speeds (e.g., 160 MHz for 5 GHz band, 320 MHz for 6 GHz band), cross-correlation thresholds that define sensitivity for pattern detection between bands (typically ranging from 0.7 to 0.95 for correlation coefficients), and memory allocation settings for continuous FFT buffers that manage ongoing computations through circular buffer implementations and cache-aligned memory allocation. The MLO parameters configuration may operate in concert to enable efficient concurrent processing, maintain processing continuity, prevent data loss, optimize resource utilization, and ensure reliable cross-band correlation, with their specific values being tuned based on hardware capabilities, processing requirements, signal characteristics, and system performance targets. For example, the concurrent processing of digitized down-converted signals in 5 GHz and 6 GHz bands may be implemented by first configuring MLO parameters where the 5 GHz band may utilize a 4096-sample buffer with 160 MHz sampling rate and 1024-point FFT processing, while the 6 GHz band employs a larger 8192-sample buffer with 320 MHz sampling rate and 2048-point FFT to accommodate its higher bandwidth requirements.

The processor 230 may be further configured to extract one or more domain-specific features from each signal domain of the plurality of distinct signal domains. The extraction of the one or more domain-specific features from each signal domain may include performing signal processing customized to the unique characteristics of each domain. In an implementation, the processor 230 may execute the domain-specific analysis concurrently for each intermediate frequency band, for different signal characteristics of each intermediate frequency band. In an example, for the 6 GHz band, the processor 230 may perform a higher-resolution spectral analysis with 320 MHz-capable processing to determine the wider channels. While processing in the 5 GHZ band the processor 230 may adjust spectral analysis parameters and temporal analysis parameters to account for different channel widths and regulatory requirements. For the 2.4 GHz band, the processor 230 may prioritize interference detection operations due to the congested nature of the spectrum. As the processor 230 may perform two or more of band-specific domain, the wireless communication device 104A to identify differences between signals that may appear similar when analyzed in a single domain or with generic parameters. The processing for each band-domain combination may improve detection accuracy in complex Wi-Fi® 7 environments where signals may span multiple bands through MLO operations while facing different interference profiles in each band.

In an implementation, the one or more domain-specific features extracted based on the spectral domain analysis may correspond to one or more spectral domain features that comprise one or more of: power spectral density measurements, frequency occupancy patterns, bandwidth utilization metrics, or channel state information. In an example, for the spectral domain analysis, the processor 230 may apply Fast Fourier Transform (FFT) operations that operate on the digitized down-converted signals to convert time-domain representations into frequency-domain representations across bandwidths of up to 320 MHz, aligning with expanded channel capabilities of Wi-Fi 7®. The processor 230 may determine power distribution across the intermediate frequency range for detection of both narrowband and wideband signal components. In an example, the processor 230 may perform spectral pattern recognition operations that compare observed spectral signatures against known signal types, while performing concurrent calculation of bandwidth utilization metrics that quantify the occupancy levels across different portions of the RF signal. The spectral analysis may further include performing inter-band correlation assessment, where the processor 230 may identify potential interference between adjacent or harmonic frequency bands through coherence measurements and cross-spectral density calculations. The spectral domain analysis may enhance the ability of the wireless communication device 104A to identify signals within congested electromagnetic environments, thereby improving channel selection, interference avoidance, and spectral efficiency in high-density Wi-Fi 7® deployments.

In accordance with an embodiment, the processor 230 may be further configured to extract one or more domain-specific features based on the temporal domain analysis that may correspond to one or more temporal domain features. The one or more temporal domain features may comprise one or more of: signal duration measurements, inter-packet gap information, time-series amplitude variations, or packet sequence patterns. In an example, for the temporal domain analysis, the processor 230 may apply time-series signal process operations to the digitized down-converted signals, including amplitude envelope detection, zero-crossing rate analysis, and autocorrelation functions to determine signal variations over time. The processor 230 may further identify packet boundaries and may calculate inter-packet timing intervals to identify protocol-specific timing signatures that can distinguish between different wireless communication standards operating within the Wi-Fi 7® frequency bands. In an example, the processor 230 may be configured to analyze packet sequence patterns and timing relationships to identify specific communication protocols, while concurrently performing cross-correlation analysis between signals detected in different intermediate frequency bands to identify Multi-Link Operation (MLO) synchronized transmissions. The temporal domain analysis may enhance the ability of the wireless communication device 104A to distinguish between legitimate Wi-Fi 7® transmissions and interference sources, optimize timing parameters for improved network synchronization, and may identify protocol-specific vulnerabilities, exploited by potential jammers in congested wireless environments.

In accordance with an embodiment, the one or more domain-specific features may be extracted based on the spatial domain analysis corresponding to one or more spatial domain features. The one or more spatial domain features may comprise one or more of a direction-of-arrival information, multiple-input-multiple-output (MIMO) channel information, spatial correlation coefficients, or beam pattern characteristics information. In an example, the processor 230 may perform the spatial domain analysis by processing signals from each MIMO antenna element of the MIMO antenna array 204 to compute phase differences between array elements, construct spatial correlation matrices, and map signal variations across the physical antenna array space separately for each band. For each IF band, the processor 230 may extract temporal properties by analyzing signal amplitude, phase variations, and power levels, while concurrently deriving spatial properties (e.g., phase differences between antenna elements, spatial correlation, and direction of arrival information) by measuring phase relationships between antenna elements, calculating spatial correlation patterns, and determining direction of arrival through phase comparisons. The dual-polarized antenna inputs may enable decomposition of signals into vertical and horizontal components for polarization-based analysis in each band. The concurrent processing across different IF bands may allow the wireless communication device 104A to create a comprehensive spatial-frequency profile by combining the band-specific characteristics. The processor 230 may generate spatial signatures for each band by integrating the temporal-spatial features, polarization components, and array manifold measurements. This multi-band spatial analysis may provide a rich set of signal characteristics (i.e., features) that captures both frequency-dependent and spatial behaviors of the received signals, enabling more robust detection and classification of potential jammers. The processor 230 may maintain concurrent processing streams for both bands while preserving the phase and amplitude relationships necessary for accurate spatial analysis, resulting in a unified signal characteristics profile that spans both frequency domains.

In accordance with an embodiment, the one or more domain-specific features may be extracted based on the polarization domain analysis corresponding to one or more polarization domain features. The one or more polarization domain features may comprise one or more of vertical-horizontal polarization ratios, polarization state changes, cross-polarization discrimination values, or polarization diversity metrics information. In the polarization domain analysis, the processor 230 may be configured to perform concurrent processing of the digitized down converted signals received through the vertical polarization and horizontal polarization paths of the dual-polarized antennas. The processor 230 may calculate polarization state parameters, such as stokes vector components to determine the polarization state of incoming signals. The processor 230 may further compute vertical-horizontal polarization ratios for each detected signal and may track the vertical-horizontal polarization ratios over time to identify polarization-dependent signatures that may help to distinguish between different signal sources and transmission modes. In an example, the processor 230 may extract cross-polarization discrimination values to measure isolation between orthogonal polarization components, quantifying the degree of polarization purity and detecting polarization leakages that may indicate multipath effects. The processor 230 may be further configured to calculate polarization diversity metrics by analyzing the correlation between signals received across different polarization paths, enabling the wireless communication device 104A to exploit polarization diversity for improved signal reception in multipath environments. The processor 230 may additionally identify temporal changes in the polarization states to detect dynamic modulation schemes that utilize polarization as an information-carrying dimension. This comprehensive polarization domain analysis may enable the wireless communication device 104A to distinguish between similarly modulated signals that differ in polarization characteristics, improve immunity to polarization-selective fading, and enable more robust signal reception in complex propagation environments typical of indoor Wi-Fi 7® deployments. For example, the processor 230 may analyze signals in a congested 6 GHZ environment where two transmissions may overlap in frequency. By calculating the vertical-horizontal polarization ratio, the processor 230 may determine that signal A exhibits a ratio of 0.9 (predominantly horizontal) with a cross-polarization discrimination of 18 dB and stable polarization characteristics over time, while signal B exhibits a ratio of 1.4 (predominantly vertical) with only 6 dB discrimination and periodic polarization state changes. Based on the stokes vector calculations, the processor 230 may identify the signal A as linearly polarized and the signal B as elliptically polarized. Despite their spectral and temporal similarities, these polarization features may enable the processor 230 to distinguish signal A as a legitimate WLAN signal transmission from the signal B as an interference source, allowing the wireless communication device 104A to optimize reception by applying appropriate polarization diversity combining that enhance the desired signal while minimizing interference.

In accordance with an embodiment, the processor 230 may be further configured to generate a fused feature vector for each intermediate frequency band of the plurality of different intermediate frequency bands from the extracted one or more domain-specific features of each signal domain of the plurality of distinct signal domains. The fused feature vector may be a unified, multi-dimensional data structure that may consolidate and integrate signal characteristics extracted from multiple domains (spectral, temporal, spatial, and polarization) for a specific intermediate frequency band. The fused vector may serve as a comprehensive signal signature that may preserve the most significant features from each domain while reducing redundancy. The fused feature vector may be generated for each intermediate frequency band based on configuration of multi-link operation (MLO) parameters across the plurality of different intermediate frequency bands. In an implementation, the processor 230 may execute feature fusion operations to synchronize the domain-specific features extracted from each signal domain, to ensure that the extracted domain-specific features describing the same temporal window of signal activity are properly correlated across the plurality of distinct signal domains. The processor 230 may be configured to group the time-aligned features into domain-specific feature matrices and may apply dimensionality reduction operations such as Principal Component Analysis (PCA) to identify the key feature dimensions while reducing computational complexity. In an example, the processor 230 may generate cross-domain correlation matrices to establish inter-domain relationship. The processor 230 may apply feature fusion operations such as weighted feature combination and non-linear mapping functions to integrate the cross-domain relationships into a unified feature representation to generate a multi-dimensional fused feature vector for each intermediate frequency band to preserve characteristics from each signal domain. The processor 230 may further assign quality metrics to each fused feature based on confidence values derived from the feature extraction process, which enables the processor 230 to appropriately weight the contribution of each feature in subsequent classification operations. The generation of the feature fusion may enhance signal determination capabilities of the wireless communication device 104A by leveraging the complementary information available across different signal domains, which result in improving classification accuracy and interference rejection in complex Wi-Fi 7® environments with overlapping RF signals and interference sources.

In an exemplary implementation, for each intermediate frequency band (e.g., 2.4 GHZ, 5 GHz, or 6 GHZ), the processor 230 may be configured to generate a fused feature vector that may include 16-64 elements. These elements represent the most significant signal characteristics from each domain, such as power spectral density and bandwidth from the spectral domain, duration and pattern information from the temporal domain, direction of arrival from the spatial domain, and polarization ratios from the polarization domain. The processor 230 may apply dimensionality reduction techniques to eliminate redundancy, assign confidence-based weights to each feature, and maintain time synchronization to ensure proper feature alignment. Thus, a comprehensive, efficient representation may be generated in the form of the fused feature vector that may enable more accurate signal classification and pattern recognition than using separate domain features, particularly for complex signals that exhibit distinctive characteristics across multiple domains.

In an exemplary implementation, let us consider a scenario where the processor 230 may analyze a signal in the 5 GHz band. The processor 230 may generate a fused feature vector by first extracting domain-specific features from a 5 GHz signal, including spectral characteristics (e.g., peak frequency at 5.32 GHz, 80 MHz bandwidth, −45 dBm power level), temporal patterns (256 us packet duration, 1024 us inter-packet gap), spatial properties (35° azimuth, 10° elevation), and polarization measurements (V/H ratio of 1.2, 15 dB cross-polarization discrimination). The processor 230 may then synchronize these features to the same 10 ms time window using MLO timing references, ensuring all measurements describe the same signal event. Next, the processor 230 may apply the PCA analysis to reduce the original 23 features to 16 principal components that may preserve 95% of the information content. The processor 230 may assign confidence scores to each feature based on signal quality metrics (with the 25 dB SNR yielding high confidence), calculate cross-domain correlations (identifying a 0.89 correlation between spatial direction and polarization features), and integrate these elements into a final 16-element fused feature vector weighted by confidence values. This comprehensive signal signature may enable accurate classification of the 5 GHz transmission as a Wi-Fi® 7 signal with specific operational characteristics, indicative of how the fused feature vector may consolidate multi-domain information into a single, computationally efficient representation.

An exemplary structure of the fused feature vector for the 5 GHz band signal is shown, for example, in Table 1 The fused feature vector for each intermediate frequency band, such as the 5 GHz band, may be a one-dimensional array that may include, for example, 16 elements [F1, F2, . . . , F16]. The Table 1 illustrates, for example, the structure of a fused feature vector for a 5 GHZ band signal. In this example, the fused feature vector may include 16 elements that may integrate signal characteristics across multiple domains. Each element in the vector may be normalized to a value between 0 and 1 to enable consistent processing. The Table 1 may indicate the elements [F1, F2, . . . , F16] by their source domains: spectral (F1-F5), temporal (F6-F9), spatial (F10-F13), and polarization (F14-F16). Each element may represent either a direct measurement or a principal component derived from the feature extraction process. This structured representation may enable efficient signal classification by preserving the most significant features from each domain while maintaining a computationally manageable format. The processor 230 may use this unified or fused vector structure for pattern matching, classification, and generating feedback for parameter optimization. Further, like the 5 GHz signal, fused feature vector may be generated for other intermediate frequency bands where values may be different and element, description, and source domain order may be same.

TABLE 1

| Structure of the Fused Feature Vector for 5 GHz Band Signal | | | |
| --- | --- | --- | --- |
| Element | Value | Description | Source Domain |
| F1 | 0.92 | Normalized power spectral density | Spectral |
| F2 | 0.75 | Normalized bandwidth utilization | Spectral |
| F3 | 0.68 | Spectral shape coefficient | Spectral |
| F4 | 0.81 | Spectral flatness metric | Spectral |

TABLE 1-continued

Structure of the Fused Feature Vector for 5 GHz Band Signal

| Element | Value | Description | Source Domain |
|---------|-------|-------------|---------------|
| F5 | 0.77 | Channel state information metric | Spectral |
| F6 | 0.63 | Normalized packet duration | Temporal |
| F7 | 0.58 | Timing pattern coefficient | Temporal |
| F8 | 0.71 | Duty cycle measurement | Temporal |
| F9 | 0.84 | Periodicity metric | Temporal |
| F10 | 0.88 | Direction of arrival component | Spatial |
| F11 | 0.67 | Spatial spread metric | Spatial |
| F12 | 0.79 | MIMO correlation coefficient | Spatial |
| F13 | 0.72 | Spatial diversity measure | Spatial |
| F14 | 0.82 | Vertical-horizontal ratio | Polarization |
| F15 | 0.75 | Cross-polarization discrimination | Polarization |
| F16 | 0.69 | Polarization stability metric | Polarization |
| F15 | 0.75 | Cross-polarization discrimination | Polarization |
| F16 | 0.69 | Polarization stability metric | Polarization |

In accordance with an embodiment, the processor 230 may be further configured to determine one or more signal patterns based on the generated fused feature vector for each intermediate frequency band of the plurality of different intermediate frequency bands. In an implementation, the processor 230 may execute pattern determination operation on the fused feature vector, where each fused feature vector may represent the multi-domain characteristics of signals within a specific intermediate frequency band. In an example, the processor 230 may perform a multi-state classification operation. The multi-state classification operation may refer to the process where the processor 230 may utilize the multiple signal state representations (time domain, frequency domain, phase, amplitude, and wavelet states) from each intermediate frequency band to perform comprehensive signal classification. The multi-state classification operation may be a quantum-inspired signal processing although very different in terms of application and way of implementation. The multi-state classification operation may include analyzing patterns across these different state representations concurrently rather than sequentially. The processor 230 may determine correlations between different states within the same frequency band and corresponding states across different frequency bands. This approach enables the wireless communication device 104A to detect complex signal patterns that might be partially visible in one state but fully apparent when multiple states are considered together. For example, when classifying a frequency-hopping signal, the processor 230 may examine temporal patterns in the time domain state, spectral characteristics in the frequency domain state, phase coherence in the phase state, and time-frequency patterns in the wavelet state. By combining evidence from all these states, the wireless communication device 104A may achieve higher classification accuracy as compared to any single state analysis. This multi-state approach may be effective for detecting sophisticated signals like frequency hopping spread spectrum (FHSS), direct sequence spread spectrum (DSSS), or signals with complex modulation schemes that exhibit distinctive features across multiple domains.

In another example, the processor 230 may be further configured to determine one or more signal patterns with unsupervised clustering to group similar feature vector, followed by supervised classification using trained model (e.g. trained ANN model 232) that may map these clusters to known signal patterns. In an example, the processor 230 may perform cross-band correlation analysis between the intermediate frequency bands such as 5 GHz and 6 GHz by normalizing the respective fused feature vector and computing correlation coefficients using sliding window operations with configurable confidence thresholds. In an example, the processor 230 may identify related signal patterns by evaluating temporal synchronization characteristics, where the processor 230 may detect similar signal bursts appearing across multiple bands with minimal time delay. The processor 230 may categorize detected patterns based on correlation coefficient ranges, such as coefficients exceeding 0.95 may indicate strong cross-band interference and coefficients between 0.90 and 0.95 may indicate legitimate signal traffic utilizing multiple bands for MLO operation. The processor 230 may further maintain pattern history buffers for each band and perform adaptive thresholding to distinguish between different pattern types including periodic interference, burst transmissions, and continuous signal presence. The pattern determination may leverage the multi-dimensional information in the fused feature vector across different frequency bands, thereby enabling the wireless communication device 104A to differentiate between legitimate Wi-Fi 7® transmissions and various interference sources, enabling more effective spectrum utilization and improved resilience against sophisticated jamming operations in contested wireless environments.

In accordance with an embodiment, the processor 230 may be further configured to convert the fused feature vector of each intermediate frequency band to a plurality of signal state representations for each intermediate frequency band of the plurality of different intermediate frequency bands. The processor 230 may be configured to convert each intermediate frequency band's fused feature vector into multiple signal state representations, for example, using the multi-state signal processing operation (e.g., a quantum-inspired processing). For each band, the processor 230 may apply a signal state transform to generate complementary state representations, i.e., the plurality of signal state representations. The plurality of signal state representations may include a time domain state that may preserve temporal characteristics, a frequency domain state generated via Fast Fourier Transform, a phase domain state generated, for example, through Hilbert transform phase extraction, an amplitude state generated, for example, from complex signal magnitude, and wavelet state, for multi-resolution analysis. The signal state transformation may effectively create a multi-dimensional state space where different signal properties may be analyzed simultaneously rather than sequentially. Each state representation may be weighted according to signal quality metrics and confidence scores derived during feature extraction, with weights that may range from 0.1 to 0.4 per state. The multi-state signal processing operation may enable the processor 230 to detect complex signal patterns that may otherwise be difficult to identify in any single domain, for example, for sophisticated signals with distinctive characteristics distributed across multiple representations, such as frequency hopping transmissions or spread spectrum signals that exhibit coordinated patterns across time, frequency, and phase domains.

In an example, the processor 230 may be configured to convert each intermediate frequency band's fused feature vector into multiple signal state representations through specific signal state transform. For example, when processing a 5 GHz band signal, the processor 230 may take the normalized 16-element fused feature vector (including elements like spectral density, bandwidth utilization, timing patterns, and polarization ratios) and may generate five distinct state representations: a) the time domain state: created by applying a temporal mapping function to preserve timing relationships in the original signal characteristics, b) the frequency domain state, for example, generated by applying FFT-based transformations to the feature elements related to spectral properties, c) the phase domain state, for example, derived by extracting phase relationships from the feature vector's spatial and spectral components, d) the amplitude state, for example, constructed by isolating and normalizing magnitude-related elements from the feature vector, and c) the wavelet state that may be generated by applying time-frequency transformation matrices to create multi-resolution signal representations. Each state may represent the same signal information but optimized for detecting different signal characteristics. For instance, when analyzing a frequency-hopping signal, the frequency domain state might clearly show spectral occupation patterns, while the time domain state reveals the temporal hopping sequence, and the phase state exposes correlation patterns between hops. By maintaining these concurrent representations for each intermediate frequency band, the processor 230 may concurrently determine multiple signal characteristics, significantly enhancing detection capability for complex signals compared to single-domain analysis.

In accordance with an embodiment, the processor 230 may be further configured to compare the determined one or more signal patterns with known signal patterns in the pattern recognition database 238. The determined one or more signal patterns may be compared with known signal patterns in the pattern recognition database 238 by extracting a feature signature from the detected signal and calculating similarity metrics against reference patterns corresponding to the known signal patterns in the pattern recognition database 238. For example, when analyzing a frequency hopping signal in the 5 GHz band, the processor 230 may be configured to generate a pattern signature that may include key characteristics from the generated multiple state representations, for example, a 10 ms hop sequence pattern from the time domain state, distinctive spectral occupancy from the frequency domain state, and 0.87 phase coherence from the phase state. This multi-state signature may be then compared against the reference patterns using a weighted Euclidean distance operation (or weighted Euclidean distance algorithm) that may prioritize the most reliable features based on signal quality metrics. The similarity scores for each potential match may be calculated using the weighted Euclidean distance operation, with the highest score (0.92 in this example) indicating the most likely classification. When the similarity score exceeds the confidence threshold (0.85), the processor 230 may definitively classify the detected signal. In this case, for example, the detected signal may be classified as a known frequency hopping jammer and may trigger the appropriate operational response based on the classification result. The comparison may enable the wireless communication device 104A to identify known signal types, detect variations of existing patterns, and isolate previously unobserved signal behaviors, ultimately improving classification accuracy and response time in wireless environments.

In accordance with an embodiment, the processor 230 may be further configured to update one or more cognitive learning parameters of a trained artificial neural network model 232 when the determined one or more signal patterns are not found in the pattern recognition database 238. The processor 230 may match newly determined signal patterns against known patterns stored in the pattern recognition database 238. Once the processor 230 identifies a signal pattern that does not correspond to any existing entry in the pattern recognition database 238 (e.g., if matching score below a predefined similarity threshold), the processor 230 may trigger an update sequence for the artificial neural network model 232. In other words, when the processor 230 may perform similarity scoring between a newly detected pattern and all existing patterns in the pattern recognition database 238, a comprehensive match score may be calculated using the weighted Euclidean distance operation across multiple signal state representations. When the highest similarity score falls below the defined threshold (e.g., less than 0.75), the processor 230 may initiate the cognitive learning update sequence. First, the processor 230 may construct a new pattern template by extracting and normalizing the multi-state features from the unrecognized signal, including spectral density patterns, temporal sequences, phase relationships, and spatial characteristics. The new pattern template may serve as the foundation for a training dataset, which the processor 230 may augment with multiple instances of the pattern captured over time with varying signal conditions. The processor 230 may then execute a neural network update operation, using backpropagation to systematically adjust synaptic weights between neurons in the hidden layers, modify activation function parameters, and update bias values. Such gradient-descent-based learning process may minimize pattern recognition error by iteratively optimizing the network's parameters until convergence criteria are met. The updated neural network parameters are then validated against a test subset before the new pattern is committed or inserted into the pattern recognition database 238 with appropriate feature vectors and classification metadata. This continuous learning capability enables the wireless communication device 104A and the system 100 to autonomously adapt to emerging signal types and interference patterns without requiring manual reconfiguration or offline training.

In accordance with an embodiment, the processor 230 may be further configured to generate feedback data based on the determined one or more signal patterns and processing performance metrics of the wireless communication device 104A. The processor 230 may generate feedback data by continuously or periodically monitoring key performance metrics such as signal detection accuracy, false alarm rates, and processing latency. The processor 230 may then correlate the key performance metrics with the determined signal patterns to identify operational parameters that yield optimal performance for specific signal environments. The processor 230 may combine pattern-specific performance data with system-level metrics such as throughput measurements, packet error rates, and energy efficiency statistics to create feedback vector (i.e., the feedback data) that may determine the effectiveness of current operational parameters. In an example, when the processor 230 may identify an MLO transmission pattern across 5 GHZ and 6 GHz bands, the processor 230 may measure detection confidence levels achieved with current parameter settings alongside resource utilization metrics, then may generate feedback data such as recommended sensitivity adjustments, processing priority assignments, and domain-specific threshold modifications to that specific pattern type. The processor 230 may further calculate statistical confidence intervals for each feedback recommendation based on historical performance data stored in a performance history database, ensuring that parameter adjustments are statistically significant rather than responses to transient conditions. This feedback generation may help the wireless communication device 104A to adapt to dynamic Wi-Fi 7® environments with varying signal densities, interference profiles, and traffic patterns, ultimately improving overall communication reliability and spectral efficiency.

In accordance with an embodiment, the processor 230 may be further configured to adjust the plurality of operational parameters based on the generated feedback data. The processor 230 may be configured to update a hierarchical parameter sequence that first modifies RF front-end parameters such as filter bandwidths and gain settings, followed by adjustments to signal processing parameters including FFT sizes and window functions, and finally updates to higher-level domain-specific feature extraction and pattern recognition parameters. In an example, when the feedback data indicates degraded performance in detecting frequency-hopping signals within the 6 GHz band, the processor 230 may adjust the operational parameter such as spectral domain sensitivity thresholds to improve frequency component detection, modifies temporal domain correlation windows to better capture hop timing characteristics, and may update pattern recognition confidence thresholds to reduce false classifications. The adjustment of the operational parameter may create a synergistic relationship between observed performance and operational configuration and may enable the wireless communication device 104A to maintain optimal performance in dynamic Wi-Fi 7® environments with varying signal conditions, interference sources, and traffic patterns.

In an example, the processor 230 may implement the adjustment of the plurality of operational parameters through a continuous feedback loop where performance metrics from signal detection and classification may drive parameter optimization. For example, after detecting and classifying a frequency-hopping signal, the processor 230 may generate feedback data including detection confidence scores (0.87), classification accuracy metrics (92%), processing latency measurements (1.2 ms), and resource utilization statistics (65% of available computational resources). The processor 230 may then analyze these metrics to identify optimization opportunities. Based on this analysis, the processor 230 may execute adjustment of the plurality of operational parameters across multiple system components, for example, increase of the FFT resolution from 1024 to 2048 points to improve spectral resolution for similar signals, modification of beamforming weights to enhance spatial sensitivity in the direction where the signal was detected, adjustment of the feature selection threshold from 0.6 to 0.7 to focus on more discriminative features, or reallocation of processing resources to prioritize the frequency bands where the signal was most prevalent. These adjustments may be applied using the gradient-based optimization operation that may ensure that the parameters converge toward optimal values while avoiding oscillation or overshooting. This closed-loop adaptation may ensure that the wireless communication device 104A and the system 100 may continuously improve its performance based on operational experience, enabling more efficient and accurate signal detection and classification over time without requiring manual reconfiguration.

In accordance with an embodiment, the processor 230 may be further configured to apply a signal state transform in two or more iterations into the plurality of signal state representations for each intermediate frequency band of the plurality of different intermediate frequency bands for the determination of the one or more signal patterns. The signal state transform may be an operation that may process multiple signal state representations to enhance specific signal characteristics and reveal patterns. In other words, the signal state transform may refer to a sequential application of transformation matrices to the time, frequency, phase, amplitude, and wavelet state representations of signals in each intermediate frequency band. Each transformation iteration may selectively amplify certain signal features while attenuating others, progressively refining the state representations to increase pattern visibility. The processor 230 may apply these transforms iteratively (typically 2-5 or more iterations) until either a pattern confidence threshold is reached, or the maximum iteration count is met, with each successive iteration using the results of previous transformations to guide further refinement.

In accordance with an embodiment, the processor 230 may perform an iterative transformation that may refine the signal state representations to extract subtle pattern characteristics. The processor 230 may process each frequency band with band-specific transformation parameters for signal characteristics present in different portions of the Wi-Fi 7® spectrum. For example, in the 6 GHz band, the processor 230 may emphasize transitions between high-order modulation states characteristic of 4K-QAM capability of Wi-Fi 7®, while in the 2.4 GHz band, the processor 230 may focus on identification of interference-related state transitions. Between the iterations, the processor 230 may perform intermediate evaluation of pattern emergence, calculating confidence metrics that quantify the reliability of developing pattern hypotheses. In an example, the processor 230 may adaptively modify transformation parameters for subsequent iterations, which focuses computational resources on the most promising pattern candidates while it reduces emphasis on less likely hypotheses. The two or more iterations may enable the wireless communication device 104A to identify complex, multi-state signal patterns such as frequency-hopping sequences, dynamic channel bonding operations, and coordinated multi-band transmissions that would be difficult to detect with single-pass analysis.

In accordance with an embodiment, the processor 230 may be further configured to update a pattern confidence metric after each iteration of the two or more iterations and stop a next iteration of application of the signal state transform when either a pattern confidence threshold is met, or a maximum number of iterations is reached. The processor 230 may perform a confidence-based iteration control by calculating a pattern confidence metric using a weighted combination of pattern match scores, state transition probabilities, and cross-domain consistency checks after completing each transformation iteration. The processor 230 may adjust acceptance criteria based on the signal environment complexity, with stricter thresholds applied in low-interference conditions and more lenient thresholds used in challenging RF environments to balance processing efficiency against detection accuracy. In an example, when processing an MLO transmission pattern across 2.4 GHz and 6 GHz bands, the processor 230 may compute confidence metrics after each transformation iteration by comparing emergent pattern characteristics against known Wi-Fi® 7 protocol signatures, incrementing the confidence value when consistent features are detected and may apply confidence penalties when contradictory attributes appear. The processor 230 may further compare the updated confidence metric against the configured threshold value after each iteration. The iteration operation may create a synergistic balance between computational efficiency and pattern detection thoroughness, enabling the wireless communication device 104A to identify high-confidence signal patterns while allocating additional processing resources only to ambiguous cases that require deeper analysis, ultimately reducing overall power consumption and processing latency while maintaining high detection accuracy in wireless environments with numerous overlapping signal types.

In accordance with an embodiment, the processor 230 may be further configured to detect a jamming signal and perform a jamming suppression of the detected jamming signal based on the determined one or more signal patterns, the generated feedback data, and a periodic adjustment of the plurality of operational parameters. The processor 230 may detect the jamming signal based on the determined signal patterns, feedback data, and adjustment of the operational parameters. The processor 230 may analyze the determined signal patterns against legitimate signal characteristics to identify the jamming indicators such as statistically improbable power distributions, non-standard spectral occupancy patterns, or protocol timing violations. If a jamming signal is identified, the processor 230 may check historical feedback data to evaluate if similar signal patterns previously correlated with performance degradation across multiple intermediate frequency bands. The detection operation may employ periodic parameter adjustments to optimize jamming mechanisms, for example, incrementally modifying detection thresholds based on observed false positive/negative rates and adjusting the weighting of different signal domains (spectral, temporal, spatial, and polarization) in the analysis. The processor 230 may further monitor interference patterns targeting MLO operations, such as synchronized disruption across multiple intermediate frequency bands or selective jamming during link handover periods. The wireless communication device 104A may maintain a database (e.g. the pattern recognition database 238) that continuously evolves based on the determined interference patterns (also may referred to as jamming patterns), enabling easy identification of both persistent and intermittent jamming sources.

In an example, the wireless communication device 104A may detect jammer type in digitized down-converted signals across the two intermediate frequency bands (e.g. 5 GHZ and 6 GHZ) based on the cross-band correlation and determined signal characteristics of the digitized down-converted signals. In an example, the spatial domain analysis across the intermediate frequency bands may provide robust signal characterization, distinguishing between legitimate traffic and potential jamming signals. Advantageously, the determined signal characteristics enable real-time adaptation of mitigation operations. The continuous analysis of the signal characteristics in the one or more signal patterns across both frequency bands may also support the cognitive learning, such as the ANN model 232, allowing the wireless communication device 104A to improve its jammer identification and mitigation capabilities over time.

In accordance with an embodiment, the processor 230 may be further configured to perform the jamming suppression of the detected jamming signal based on the determined one or more signal patterns, the generated feedback data, and a periodic adjustment of the plurality of operational parameters. The processor 230 may apply spatial nulling through an adaptive beamforming process that may dynamically compute and update complex antenna weights for the MIMO antenna array 204. Based on the calculated null steering parameters, the processor 230 may generate a null pattern by adjusting the amplitude and phase of each antenna element to create destructive interference in the jammer's direction while maintaining constructive interference for signals-of-interest. The nulling implementation may include real-time computation of antenna weight vector using constrained optimization techniques that may minimize power reception from the jammer's spatial location while maximizing the signal-to-interference-plus-noise ratio (SINR) for desired signals. The processor 230 may continuously adjust the null pattern using a feedback loop that monitors residual interference levels and jammer movement through spatial tracking, enabling dynamic suppression that follows mobile jammers. In the adaptive beamforming, radiation pattern of the MIMO antenna array 204 may be adjusted in real-time to optimize signal reception. The processor 230 may execute adaptive beamforming using the 4×4 MIMO antenna array 204 through a two-fold process. Firstly, the processor 230 may be configured to dynamically enhance signal reception in desired directions by computing and applying optimal beamforming weights (amplitude and phase), for example, based on Minimum Variance Distortion Less Response. For example, if a signal-of-interest is detected at 30 degrees, the processor 230 may calculate complex weights for each antenna element to form a beam maximum in that direction. Concurrently, null steering may be executed by projecting such beamforming weights onto the null space of interference directions. For example, if interference is detected at 90 degrees, the processor 230 may modify the beamforming weights to create a spatial null in that direction while maintaining the desired beam pattern. The weights may be continuously updated based on changing signal conditions, where the processor 230 may utilize spatial covariance estimation and interference-plus-noise modeling to optimize the beam pattern, achieving both objectives of signal enhancement and interference suppression concurrently. For example, when an interference source moves (e.g., one of the moving interface sources 114) from 90° to 100°, the processor 230 may immediately recalculate weights to shift the null position while preserving desired signal reception, thereby enabling dynamic interference rejection, consistent signal enhancement, and real-time beam pattern optimization for robust spectrum monitoring. In other words, the processor 230 may be further configured to maintain null positions for the null steering through adaptive tracking of the moving interference sources 114.

In accordance with an embodiment, the processor 230 may be configured to perform signal classification based on the extracted domain-specific features The classified signals may comprise one or more of legitimate signal communications (e.g., from legitimate signal sources 108), potential jamming signals (e.g., from the signal jamming sources 110), frequency hopping transmissions (e.g., from the moving interference sources 114), or unknown or anomalous signals tagged for further analysis (e.g., from the unknown signal sources 112).

In accordance with an embodiment, the processor 230 may be further configured to control the wireless communication device 104A to trigger an operational response based on the classified signals and the cross-band correlation. The operational response may comprise at least one of a spectrum sensing and management action, a dynamic spectrum reallocation action to adjust spectrum resources to optimize network performance and reduce interference, or a distribution of spectrum monitoring information across a plurality of other wireless communication device 104As in the wireless mesh network 106. In accordance with an embodiment, the spectrum sensing and management action may be at least one of: selection of a frequency band and a polarization type at the wireless communication device 104A for data communication above a defined data throughput, adjustment of spectrum analysis parameters at the wireless communication device 104A or tracking and characterization of threat signals in a contested spectrum environment.

In an example, when the classified signals are identified as legitimate signal communications (e.g., from legitimate signal sources 108, the processor 230 may be further configured to select optimal frequency bands for signal monitoring while maintaining current communication links; may adjust filter parameters of the plurality of different filters 212 and correlation thresholds in the cross-correlation to maintain signal quality based on validated patterns. The processor 230 may optimize spectrum resource allocation to enhance network performance. For example, to optimize band selection, the processor 230 may switch between 2.4/5/6 GHz bands based on interference levels. In another example, in order to optimize band selection, the processor 230 may dynamically select 6 or 7 GHz for 320 MHz bandwidth when higher throughput needed from a current throughput state or may switch back to 5 GHz for 160 MHz bandwidth when appropriate (e.g., throughput need decreased) or fall back to 2.4 GHz band when needed for redundancy. Further, to optimize resolution, the processor 230 may select between 19 kHz, 39 kHz, or 75 kHz subcarrier spacing in an example. In another example, the same data item may be sent via the first intermediate frequency band the second intermediate frequency band to not only improve reliability through redundant processing paths but also provide periodically cross-validation of signal characteristics which in turn enhances detection accuracy through multiple observations and provides better immunity against band-specific interference. Further, other operational responses when the classified signals are legitimate signal communications (e.g., from legitimate signal sources 108) may include but are not limited to spectrum usage coordinate and legitimate signal information sharing with other wireless communication devices 104B, 104C, . . . , 104N in the wireless mesh network 106, update of the pattern database with confirmed legitimate signal signatures, continuous spectrum monitoring to track signal characteristic changes, operational parameters adaptation based on evolving signal conditions. These actions may collectively ensure reliable handling of legitimate communications while optimizing system awareness and performance.

In another scenario, when the classified signals are potential jamming signals, the processor 230 may be configured to perform the following operational response or actions: may execute null steering through adaptive beamforming to minimize jamming signal reception while maintaining tracking of the moving interference sources 114; may optimize filter configurations and LO parameters for enhanced jamming rejection; may update detection parameters and correlation thresholds based on identified jamming patterns; may generate alerts when energy patterns match defined jamming threat criteria; may continuously monitor spectral density variations to assess jamming effectiveness; and may adapt bandwidth allocation to maintain optimal network performance in presence of jamming signals. These coordinated actions may enable effective jamming mitigation while maintaining network operation.

In yet another scenario, when the classified signals are identified as frequency hopping transmissions (e.g., from the moving interference sources 114), the processor 230 may dynamically adjust bandwidth and correlation parameters to maintain tracking as frequencies change; may perform cross-band correlation to validate detected frequency hops; may execute adaptive beamforming to maintain signal reception across frequency transitions; may update the pattern recognition database 238 with newly identified hopping sequences; may share hopping pattern information across the wireless mesh network 106 for coordinated monitoring; may generate alerts if hopping patterns match threat criteria; and may adapt spectrum allocation to minimize interference with legitimate communications. These coordinated actions may enable effective tracking and response to frequency hopping signals.

In another scenario, when the classified signals are identified as unknown or anomalous signals tagged for further analysis (e.g., from the unknown signal sources 112), the processor 230 may be configured to generate the following operational response (or perform the following actions): may execute enhanced cross-band correlation across both intermediate frequency bands to gather additional signal characteristics; may perform high-resolution spectral analysis by adjusting subcarrier spacing and LO drifting parameters; may compare signal patterns against the pattern recognition database 238 using the trained ANN model 232 for potential matches; may collect and store detailed signal parameters including modulation, timing, and frequency characteristics for further analysis; may distribute anomalous signal information across the wireless mesh network 106 to gather correlated observations; may generate alerts for persistent unknown patterns; may adapt signal detection thresholds for the unknown or anomalous signals to improve sensitivity for similar future signals; and may maintain continuous monitoring of the identified frequency bands where unknown signals were detected. These actions may enable comprehensive characterization and tracking of unknown signal sources.

In accordance with an embodiment, the processor 230 may be further configured to generate threat assessments based on the classified signals. The threat assessments may be based on real-time analysis of classified signals. The threat classification may be jamming detection, protocol violations, such as unauthorized or anomalous network behaviors, behavioral anomalies (e.g., using the ANN model 232 to recognize deviations from expected RF patterns), or signal origin tracking (e.g., locating sources of threats using multi-node triangulation and spatial processing). The processor 230 may be further configured to generate one or more alerts when the correlated energy patterns match a defined threat criteria as the operational response.

In accordance with an embodiment, the processor 230 may be further configured to update a database of historical signal correlation patterns (i.e., the pattern recognition database 238), the after each event of the cross-band correlation. The processor 230 may be further configured to execute a trained artificial neural network model, i.e., the ANN model 232, to identify recurring signal patterns at each event of the cross-band correlation. The processor 230 may be further configured to update correlation thresholds based on pattern recognition results from the identified recurring signal patterns at each event of the cross-band correlation. The processor 230 may be further configured to adjust detection parameters of signal correlation patterns in the cross-band correlation based on successful pattern matches to identify new or evolving signal patterns at one or more subsequent events of the cross-band correlation as the operational response. This adaptive learning mechanism improves accuracy in cross-band correlation, ensuring the wireless communication device 104A may effectively track signal behaviors and enhances real-time spectrum monitoring and threat detection.

Figure 3:
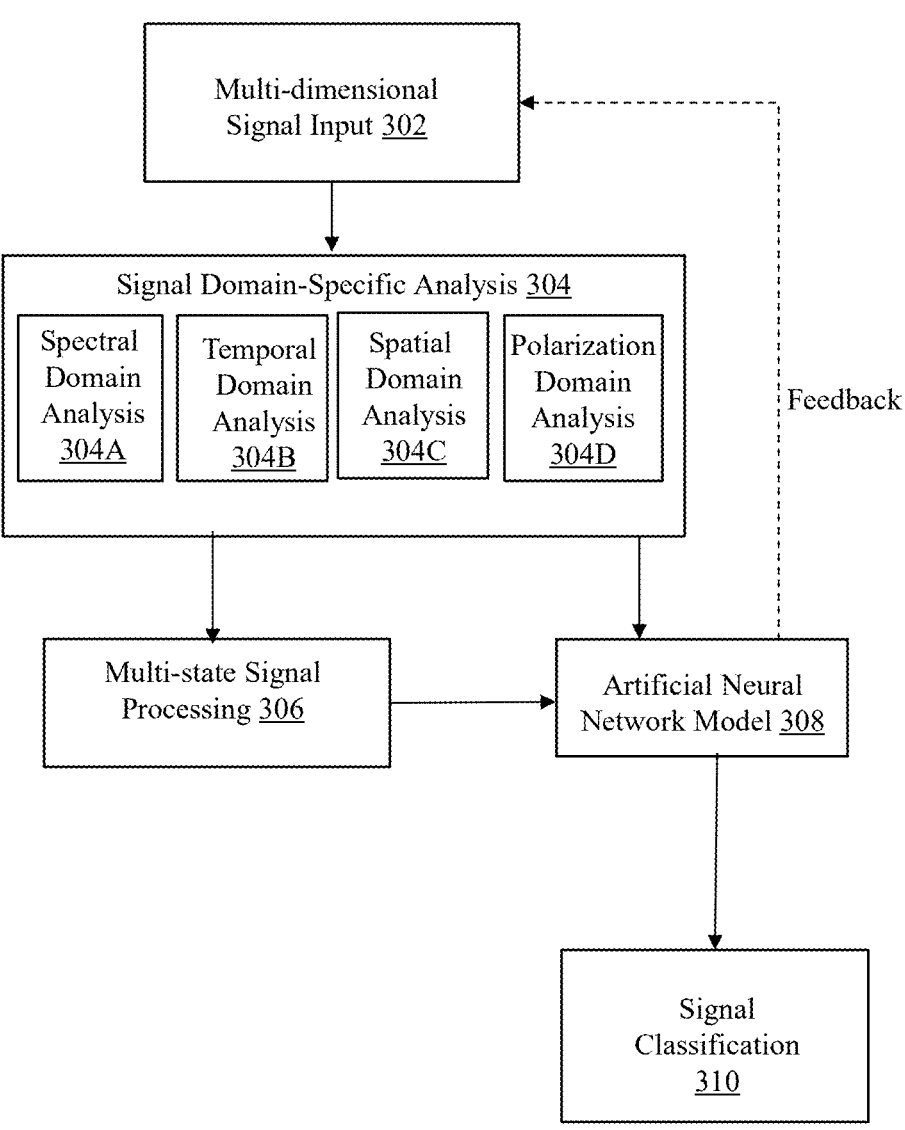
FIG. 3 is a diagram that illustrates an exemplary scenario for implementation of a wireless communication device for adaptive RF spectrum analysis, in accordance with an exemplary embodiment of the disclosure.

FIG. 3 is a diagram that illustrates an exemplary scenario of implementation of a wireless communication device for adaptive RF spectrum analysis, in accordance with an exemplary embodiment of the disclosure. FIG. 3 is explained in conjunction with elements from the FIGS. 1 and 2. With reference to FIG. 3, there is shown an exemplary signal processing pipeline using operations 302 to 310 for an exemplary scenario of adaptive RF spectrum analysis. In this exemplary scenario, the wireless communication device 104A may integrate MIMO and MLO capabilities within a Wi-Fi® 7 or 6E-enabled system to perform adaptive RF spectrum analysis, signal detection, and cross-band correlation. In accordance with one embodiment, MIMO architecture may be utilized to improve spatial resolution and direction finding, while MLO facilitates concurrent multiband signal processing, thereby increasing detection accuracy and reducing latency. The integration of MIMO and MLO within the Wi-Fi® 7 framework enables optimized spectrum utilization, interference mitigation, and adaptive RF spectrum analysis across multiple frequency bands, providing a robust and efficient solution for real-time wireless communication monitoring, data communication, and threat detection.

At operation 302, multi-dimensional signal input may be provided to the wireless communication device 104A. The wireless communication device 104A may receive the digitized down-converted signals from the RF front-end 208 across multiple intermediate frequency bands.

At operation 304, signal domain-specific analysis may occur. The digitized down-converted signals may be processed through signal domain-specific analysis, which may comprise spectral domain analysis 304A, temporal domain analysis 304B, spatial domain analysis 304C, and polarization domain analysis 204D across the plurality of distinct signal domains (described in detail, for example, in FIG. 2). The one or more domain-specific features relevant to its respective signal domain of the plurality of distinct signal domains from the input signals may be extracted based on the domain-specific analysis extracts characteristic features.

At operation 306, multi-state signal processing may occur. The processor 230 may be configured to generate a fused feature vector for each intermediate frequency band of the plurality of different intermediate frequency bands from the extracted one or more domain-specific features of each signal domain of the plurality of distinct signal domains. The processor 230 may then convert the fused feature vector of each intermediate frequency band to a plurality of signal state representations for each intermediate frequency band of the plurality of different intermediate frequency bands. The processor 230 may then apply a signal state transform in two or more iterations into the plurality of signal state representations for each intermediate frequency band of the plurality of different intermediate frequency bands for the determination of the one or more signal patterns.

At operation 308, the extracted one or more domain-specific features may be provided to the artificial neural network (ANN) model 232 for pattern recognition.

At operation 310, the signal classification operation may occur. The outputs from the multi-state signal processing and the ANN model 232 may be combined and provided to perform the signal classification operation, where final signal pattern determination may occur.

A feedback path, represented by the dashed line, may connect the signal classification data back to the input stages, enabling the wireless communication device 104A to adapt its operational parameters based on processing results. This closed-loop architecture may create a synergistic relationship between signal detection, processing, and parameter optimization, continually refining the ability of the wireless communication device 104A to identify and classify signals in complex RF spectrum environments.

Figure 4A:
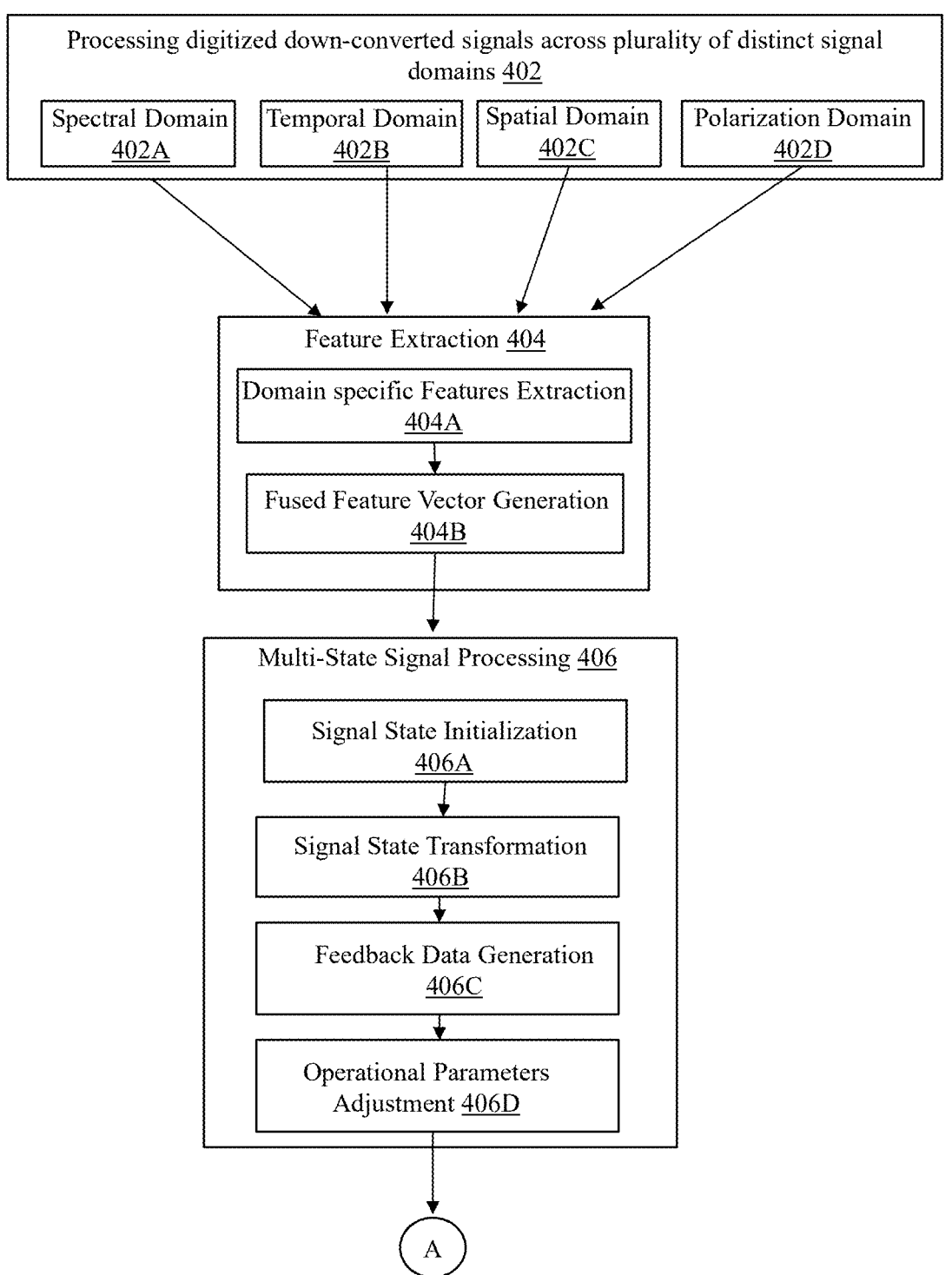
FIGS. 4A and 4B collectively, is a diagram that illustrates another exemplary scenario for implementation of a wireless communication device for the adaptive RF spectrum analysis, in accordance with an exemplary embodiment of the disclosure.
Figure 4B:
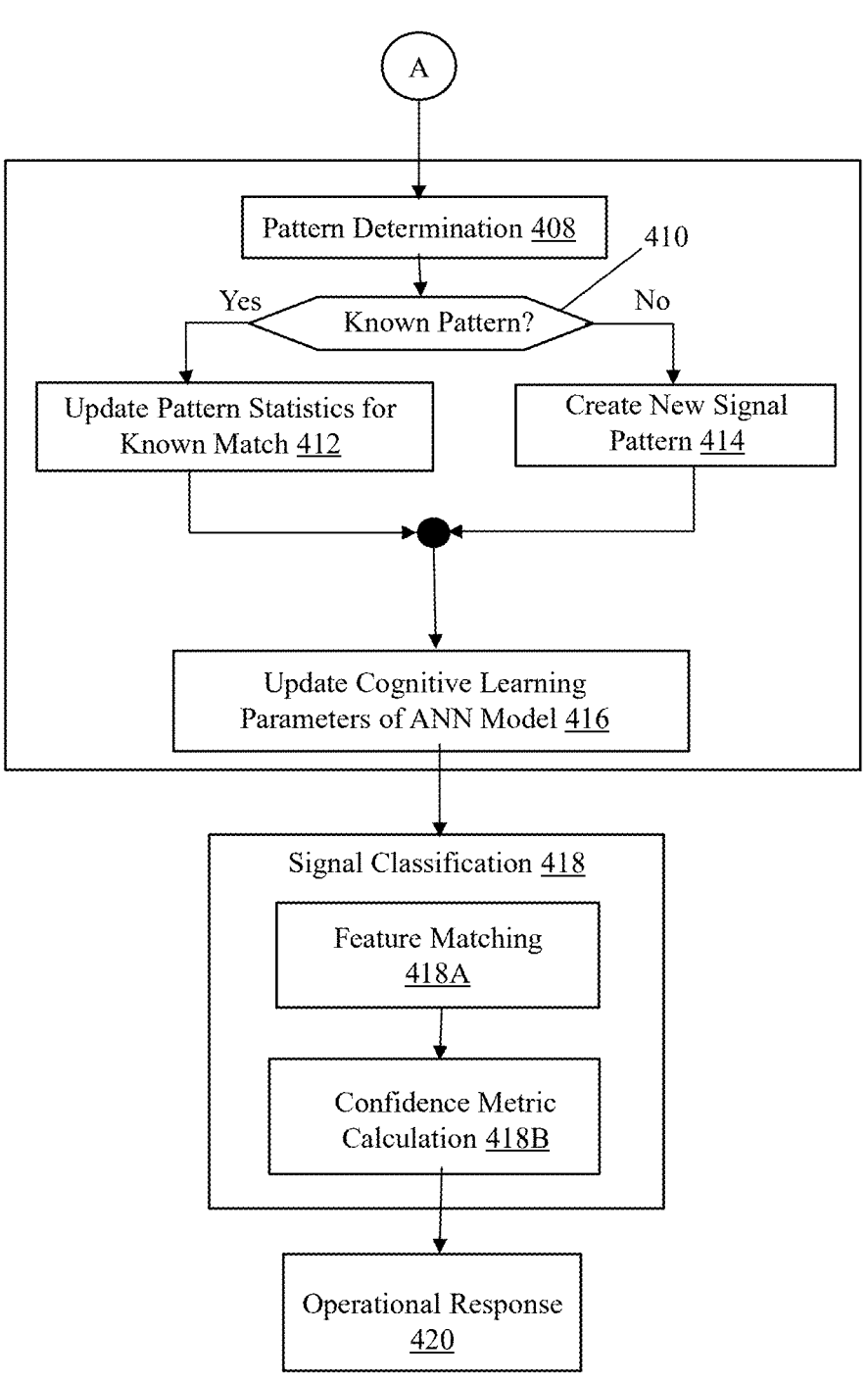

FIGS. 4A and 4B, collectively is a diagram that illustrates an exemplary scenario for implementation of a wireless communication device for adaptive RF spectrum analysis, in accordance with an exemplary embodiment of the disclosure. FIGS. 4A and 4B are explained in conjunction with elements from FIGS. 1, 2 and 3. With reference FIGS. 4A and 4B, there is shown an exemplary signal processing pipeline using operations 402 to 420 to describe, for example, an adaptive RF spectrum analysis. In this exemplary scenario, the wireless communication device 104A may integrate MIMO and MLO capabilities within a Wi-Fi® 7 or 6E-enabled system to perform adaptive RF spectrum analysis, signal detection, and cross-band correlation. In accordance with one embodiment, MIMO architecture may be utilized to improve spatial resolution and direction finding, while MLO facilitates concurrent multi-band signal processing, thereby increasing detection accuracy and reducing latency. The integration of MIMO and MLO within the Wi-Fi® 7 framework enables optimized spectrum utilization, interference mitigation, and adaptive RF spectrum analysis across multiple frequency bands, providing a robust and efficient solution for real-time wireless communication monitoring, data communication, and threat detection.

At operation 402, processing of the digitized down-converted signals across plurality of distinct signal domains may occur. The processing may occur concurrently or may operate through multiple coordinated sub-stages. At operation 402A, the spectral domain analysis may be performed. At operation 402B, temporal domain analysis may be performed. At operation 402C, the spatial domain analysis may be performed. At operation 402D, the polarization domain analysis may be performed.

At operation 404, feature extraction may be performed. The feature extraction mechanism may operate through multiple coordinated sub-stages, such as from operation 404A to 404B. At operation 404A, the digitized down-converted signals may be processed across the plurality of distinct signal domains to extract the one or more domain-specific features from each signal domain of the plurality of distinct signal domains. At operation 404B, the fused feature vector is generated for each intermediate frequency band of the plurality of different intermediate frequency bands from the extracted one or more domain-specific features of each signal domain of the plurality of distinct signal domains.

At operation 406, multi-state signal processing may occur. The multi-state signal processing may operate through multiple coordinated sub-stages, such as from operation 406A to 406D. At operation, 406A, state initialization may occur, where the fused feature vector of each intermediate frequency band may be converted to a plurality of signal state representations for each intermediate frequency band of the plurality of different intermediate frequency bands. In other words, each frequency band may be represented in multiple states through a plurality of signal state representations. Subsequently, at operation, 406B, signal state transformation may occur in which a signal state transform may be applied to refine the plurality of signal state representations iteratively in two or more iterations for the determination of the one or more signal patterns. The results of the transformations may enable feedback data generation at operation 406C, which may quantify processing performance and signal characteristics. Finally, at operation 406D, the operational parameters adjustment may utilize this feedback data to optimize configuration parameters initially set at the wireless communication device 104A.

At operation 408, pattern determination may occur. The processor 230 may receive the operational parameters. At operation 410, the processor 230 may determine whether the identified signal pattern matches a known pattern in the pattern recognition database 238. At operation 412, it may be determined that the signal pattern is the known pattern, then the processor 230 may proceed to update pattern statistics for known match, where occurrence frequencies and environmental contexts may be recorded. At operation 414, if it is determined that the signal pattern is not a known pattern, then the processor 230 may create a new signal pattern, establishing a new pattern entry with corresponding attributes.

At operation 416, the processor 230 may update cognitive learning parameters of the ANN Model 232, refining the neural network weights and thresholds based on the pattern recognition results to improve future classification accuracy.

At operation 418, signal classification may occur. The signal classification may be performed through multiple coordinated sub-stages, such as from operation 418A and 418B. At operation 418A, feature matching may occur, where signal characteristics are compared against known signal patterns. At operation 418B, confidence metric calculation may occur, where statistical confidence values are assigned to classification decisions.

At operation 420, operational response may be generated by the wireless communication device 104A. The processor 230 may implement appropriate actions based on the classification results, such as potential jamming countermeasures, channel selection adjustments, or resource allocation modifications appropriate for the RF environment.

In contrast to conventional systems and devices, the disclosed wireless communication device 104A achieves adaptive RF spectrum analysis through intelligent integration of operations such as setting operational parameters, multi-domain processing operations, generation of fused feature vector, determination of signal patterns across multiple intermediate frequency bands and adjustment of operational parameters based on feedback data. The generation of the fused feature vector may improve signal identification accuracy, particularly for complex signals with distinctive characteristics distributed across different domains, enabling the detection of sophisticated transmission operations employed in modern wireless systems. Furthermore, the adjustment of the operational parameters based on the feedback data may enable the wireless communication device 104A to continuously refine and improve its adaptive processing capabilities.

In accordance with an embodiment, the training of the ANN model 232 for spectrum monitoring may follow a structured approach that may integrate deep learning techniques with real-time RF signal processing. In an exemplary implementation, the ANN model 232 may be used for identifying recurring signal patterns at each event of the cross-band correlation. The ANN model 232 may enable adaptive spectrum analysis by leveraging a combination of deep learning, specifically using CNNs, LSTMs, and Transformer-based architectures to recognize complex RF signatures. The training process may include data acquisition and preprocessing, where the system 100 may use some test wireless communication devices (e.g., like the wireless communication devices 104A, 104B, 104C, . . . , 104N) and capture RF signals using a 4×4 MIMO antenna array, such as the MIMO antenna array 204, which may supports dual-polarization and operates from DC to 100 GHz or DC to 300 GHz. The signal filtering and conversion may be applied before digitization, using band-specific filtering to isolate signals of interest. Further, FFT and wavelet transforms may be used for spectral analysis, ensuring frequency-domain features are extracted. Thereafter, feature extraction may occur. The system 100 may apply multi-dimensional analysis combining spectral, temporal, and spatial processing to enhance detection accuracy. Further, MLO-based cross-band correlation may be used to align data from predefined frequency bands like the 5 GHZ and 6 GHz bands. Further, features, such as modulation type, frequency components, interference patterns, and spatial signatures may be extracted. Thereafter, the ANN model 232 may be trained using labeled historical datasets stored in the pattern recognition database 238. The convolutional neural network (CNN) layers may be used to handle spatial features, while the Long short-term memory (LSTM) layers may be used for sequential pattern detection over time. Further, to further enhance detection and classification of signals, transformer-based models may be deployed for contextual feature learning and adaptive anomaly detection. The federated learning techniques may be employed to enable distributed training across multiple nodes for real-time adaptation to obtain the trained ANN model 232.

In accordance with an embodiment, performance optimization to optimize network parameters may be carried out using Bayesian hyperparameter tuning. Further, Pruning, quantization, and knowledge distillation may help reduce computational overhead. The trained ANN model 232 may undergo real-time updates via online learning algorithms to adapt to new interference patterns. Examples of the online learning algorithms used may include Multi-Armed Bandit (MAB) Algorithms, Deep Q-Networks (DQN) for Spectrum Adaptation, or Incremental Learning (Online Backpropagation). Each node in the wireless mesh network 106 may contribute to global model updates (e.g., at the central cloud server 102) without sharing raw data. For example, learned interference features may be shared across different locations to enhance pattern recognition.

Furthermore, during execution, the trained ANN 232 may process incoming RF data to detect signal anomalies, classify threats, and support dynamic spectrum reallocation. The system 100 may integrate edge computing for local signal classification and the central cloud server 102 (cloud ANN model) for large-scale anomaly detection. The trained ANN 232 allows AI-enhanced spectrum monitoring enhanced real-time threat detection, dynamic signal classification, cross-band interference mitigation, and autonomous spectrum adaptation. By leveraging the Peltbeam's ANN model, such as the ANN model 232, wireless spectrum sensing, signal identification, and interference analysis may be significantly enhanced across a wide range of frequency bands (DC to 300 GHz).

Figure 5A:
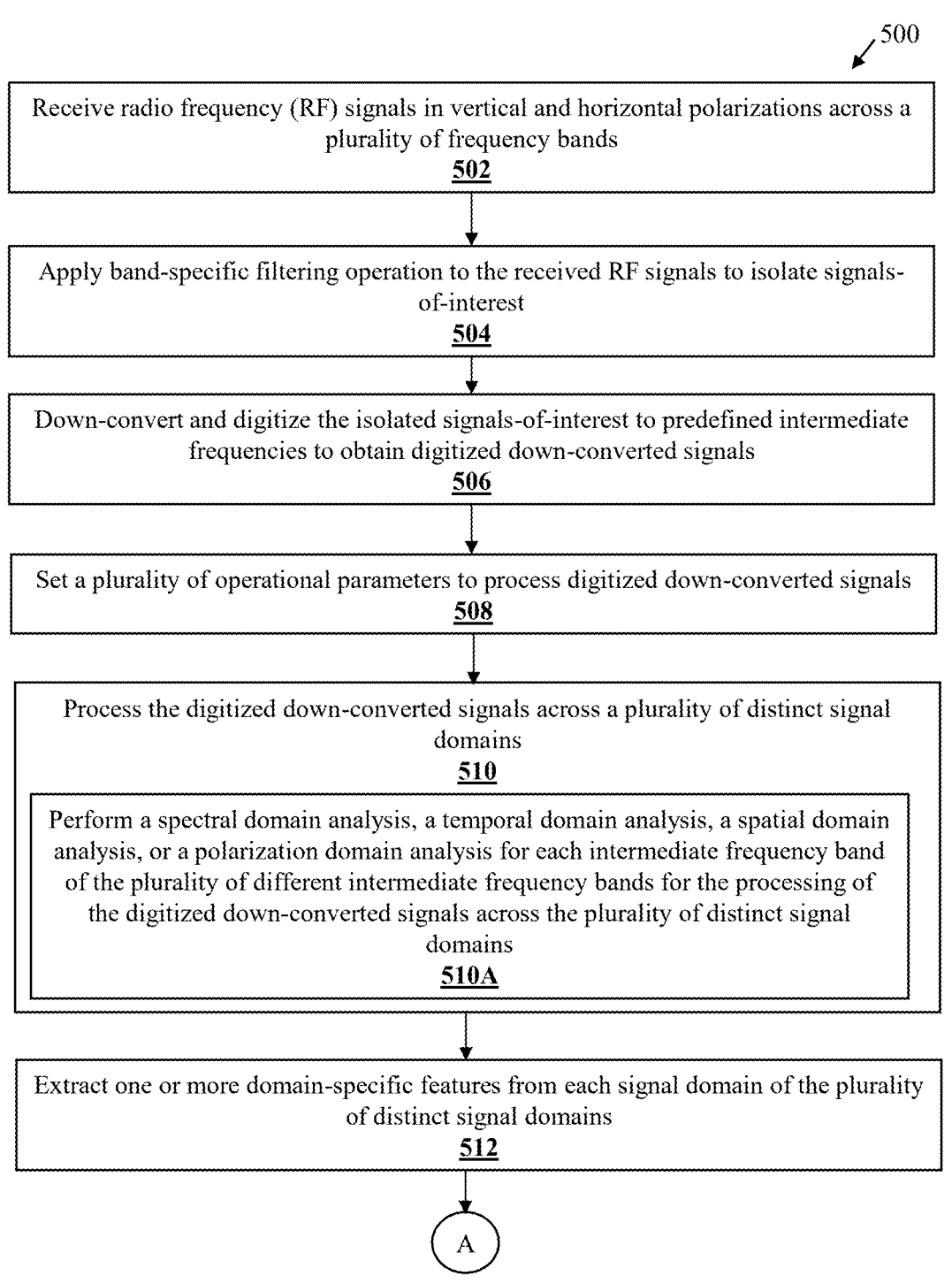
Figure 5C:
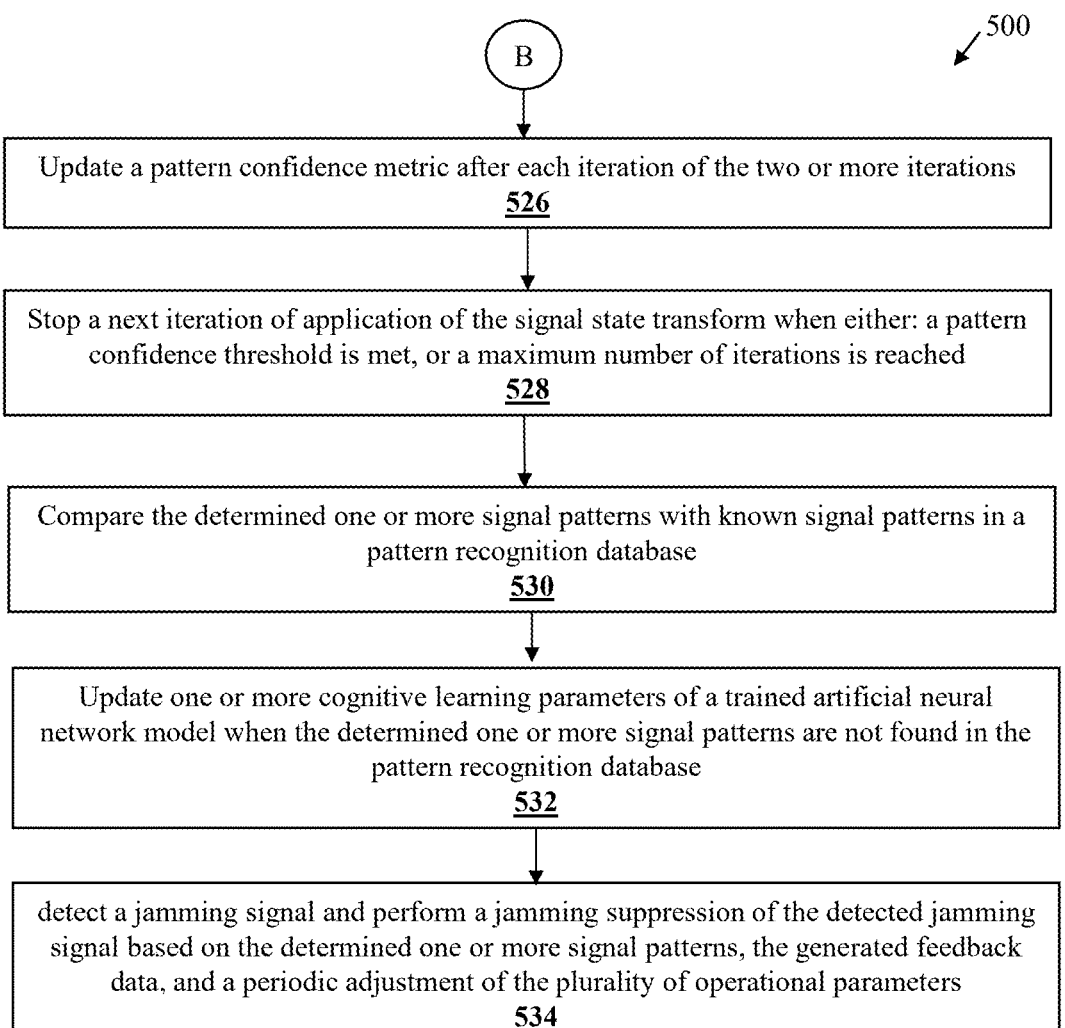

FIGS. 5A, 5B and 5C collectively, is a flowchart of a method for adaptive RF spectrum analysis, in accordance with an embodiment of the disclosure. FIGS. 5A, 5B and 5C are explained in conjunction with elements from FIGS. 1, 2, 3, 4A and 4B. With reference to 5A, 5B and 5C, there is shown a flowchart of a method 500 comprising exemplary operations 502 through 534. The method 500 may be implemented in any of the wireless communication devices 104A, 104B, 104C, . . . , 104N.

At 502, radio frequency (RF) signals may be received in vertical and horizontal polarizations across a plurality of frequency bands.

At 504, band-specific filtering operation may be applied to the received RF signals to isolate signals-of-interest.

At 506, the isolated signals-of-interest may be down-converted and digitized to predefined intermediate frequencies to obtain digitized down-converted signals.

At 508, the plurality of operational parameters may be set (e.g., at the wireless communication device 104A) to process the digitized down-converted signals.

At 510, the digitized down-converted signals may be processed across the plurality of distinct signal domains. The operation 510 may include one sub-operations, such as operation 510A. At 510A, the spectral domain analysis 304A, the temporal domain analysis 304B, the spatial domain analysis 304C, or the polarization domain analysis 304D for each intermediate frequency band of the plurality of different intermediate frequency bands may be performed for the processing of the digitized down-converted signals across the plurality of distinct signal domains.

At 512, the one or more domain-specific features from each signal domain of the plurality of distinct signal domains may be extracted.

At 514, a fused feature vector may be generated for each intermediate frequency band of the plurality of different intermediate frequency bands from the extracted one or more domain-specific features of each signal domain of the plurality of distinct signal domains.

At 516, the one or more signal patterns may be determined based on the generated fused feature vector for each intermediate frequency band of the plurality of different intermediate frequency bands.

At 518, the fused feature vector of each intermediate frequency band may be converted to the plurality of signal state representations for each intermediate frequency band of the plurality of different intermediate frequency bands.

At 520, the signal state transform may be applied in two or more iterations into the plurality of signal state representations for each intermediate frequency band of the plurality of different intermediate frequency bands for the determination of the one or more signal patterns.

At 522, feedback data may be generated based on the determined one or more signal patterns and processing performance metrics of the wireless communication device.

At 524, the plurality of operational parameters may be adjusted based on the generated feedback data.

At 526, a pattern confidence metric may be updated after each iteration of the two or more iterations.

At 528, a next iteration of application of the signal state transform may be stopped when either a pattern confidence threshold is met, or a maximum number of iterations is reached.

At 530, the determined one or more signal patterns may be compared with known signal patterns in a pattern recognition database 238.

At 532, the one or more cognitive learning parameters of the trained artificial neural network model 232 may be updated when the determined one or more signal patterns are not found in the pattern recognition database 238.

At 534, a jamming signal may be detected, and the jamming suppression of the detected jamming signal may be performed based on the determined one or more signal patterns, the generated feedback data, and a periodic adjustment of the plurality of operational parameters.

Various embodiments of the disclosure may provide the wireless communication device 104A. The wireless communication device 104A may include the processor 230 configured to set a plurality of operational parameters to process digitized down-converted signals. The digitized down-converted signals may be input signals in a plurality of different intermediate frequency bands. The processor

230 may be further configured to process the digitized down-converted signals across a plurality of distinct signal domains. The processor 230 may be further configured to extract one or more domain-specific features from each signal domain of the plurality of distinct signal domains. The processor 230 may be further configured to generate a fused feature vector for each intermediate frequency band of the plurality of different intermediate frequency bands from the extracted one or more domain-specific features of each signal domain of the plurality of distinct signal domains. The processor 230 may be further configured to determine one or more signal patterns based on the generated fused feature vector for each intermediate frequency band of the plurality of different intermediate frequency bands. The processor 230 may be further configured to generate feedback data based on the determined one or more signal patterns and processing performance metrics of the wireless communication device. The processor 230 may be further configured to adjust the plurality of operational parameters based on the generated feedback data.

Various embodiments of the disclosure may provide a computer program product for adaptive RF spectrum analysis, the computer program product comprising a non-transitory computer-readable storage medium having program instructions embodied therewith, the program instructions are executable by a system to cause the system to execute operations, the operations comprising setting a plurality of operational parameters to process digitized down-converted signals, where the digitized down-converted signals may be input signals in a plurality of different intermediate frequency bands. The operations may further comprise processing the digitized down-converted signals across a plurality of distinct signal domains. The operations may further comprise extracting one or more domain-specific features from each signal domain of the plurality of distinct signal domains. The operations may further comprise generating a fused feature vector for each intermediate frequency band of the plurality of different intermediate frequency bands from the extracted one or more domain-specific features of each signal domain of the plurality of distinct signal domains. The operations may comprise determining one or more signal patterns based on the generated fused feature vector for each intermediate frequency band of the plurality of different intermediate frequency bands. The operations may comprise generating feedback data based on the determined one or more signal patterns and processing performance metrics of a wireless communication device. The operations may comprise adjusting the plurality of operational parameters based on the generated feedback data.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed of as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowchart, depending upon the technology involved, the operations can be performed in a different order than what is shown in the flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A wireless communication device, comprising:
a processor configured to:
    set a plurality of operational parameters to process digitized down-converted signals, wherein the digitized down-converted signals are input signals in a plurality of different intermediate frequency bands;
    process the digitized down-converted signals across a plurality of distinct signal domains;
    extract one or more domain-specific features from each signal domain of the plurality of distinct signal domains;
    generate a fused feature vector for each intermediate frequency band of the plurality of different intermediate frequency bands from the extracted one or more domain-specific features of each signal domain of the plurality of distinct signal domains;
    determine one or more signal patterns based on the generated fused feature vector for each intermediate frequency band of the plurality of different intermediate frequency bands;
    generate feedback data based on the determined one or more signal patterns and processing performance metrics of the wireless communication device;
    adjust the plurality of operational parameters based on the generated feedback data; and
    detect a jamming signal and perform a jamming suppression of the detected jamming signal based on the determined one or more signal patterns, the generated feedback data, and a periodic adjustment of the plurality of operational parameters.

2. The wireless communication device according to claim 1 further comprising a multiple-input-multiple-output (MIMO) antenna array that comprises a plurality of dual-polarized antennas configured to receive radio frequency (RF) signals in vertical and horizontal polarizations across a plurality of frequency bands that ranges from direct current (DC) to 300 gigahertz (GHz).

3. The wireless communication device according to claim 2, further comprising a radio frequency (RF) front-end coupled to the MIMO antenna array and configured to:
    apply band-specific filtering to the received RF signals to isolate signals-of-interest; and
    down-convert and digitize the signals-of-interest to predefined intermediate frequencies to obtain the digitized down-converted signals.

4. The wireless communication device according to claim 1, wherein the plurality of operational parameters comprises two or more of: radio frequency (RF) front-end parameters, signal processing parameters, multiple-input-multiple-output (MIMO) parameters, multi-link operation (MLO) parameters, domain-specific feature extraction parameters, or signal pattern classification parameters.

5. The wireless communication device according to claim 1, wherein the plurality of distinct signal domains comprises two or more of: a spectral domain, a temporal domain, a spatial domain, or a polarization domain.

6. The wireless communication device according to claim 1, wherein the processor is further configured to perform two or more of: a spectral domain analysis, a temporal domain analysis, a spatial domain analysis, or a polarization domain analysis for each intermediate frequency band of the plurality of different intermediate frequency bands for the processing of the digitized down-converted signals across the plurality of distinct signal domains.

7. The wireless communication device of claim 6, wherein the one or more domain-specific features extracted based on the spectral domain analysis correspond to one or more spectral domain features that comprise one or more of: power spectral density measurements, frequency occupancy patterns, bandwidth utilization metrics, or channel state information.

8. The wireless communication device according to claim 6, wherein the one or more domain-specific features extracted based on the temporal domain analysis correspond to one or more temporal domain features that comprise one or more of: signal duration measurements, inter-packet gap information, time-series amplitude variations, or packet sequence patterns.

9. The wireless communication device according to claim 6, wherein the one or more domain-specific features extracted based on the spatial domain analysis correspond to one or more of: spatial domain features that comprise one or more of: a direction-of-arrival information, multiple-input-multiple-output (MIMO) channel information, spatial correlation coefficients, or beam pattern characteristics information.

10. The wireless communication device according to claim 6, wherein the one or more domain-specific features extracted based on the polarization domain analysis correspond to one or more polarization domain features that comprise one or more of: vertical-horizontal polarization ratios, polarization state changes, cross-polarization discrimination values, or polarization diversity metrics information.

11. The wireless communication device according to claim 1, wherein the fused feature vector is generated for each intermediate frequency band based on configuration of multi-link operation (MLO) parameters across the plurality of different intermediate frequency bands.

12. The wireless communication device according to claim 1, wherein the processor is further configured to convert the fused feature vector of each intermediate frequency band to a plurality of signal state representations for each intermediate frequency band of the plurality of different intermediate frequency bands.

13. The wireless communication device according to claim 12, wherein the one or more signal patterns are determined further based on the plurality of signal state representations for each intermediate frequency band of the plurality of different intermediate frequency bands.

14. The wireless communication device according to claim 12, wherein the processor is further configured to apply a signal state transform in two or more iterations into the plurality of signal state representations for each intermediate frequency band of the plurality of different intermediate frequency bands for the determination of the one or more signal patterns.

15. The wireless communication device according to claim 14, wherein the processor is further configured to:
update a pattern confidence metric after each iteration of the two or more iterations; and stop a next iteration of application of the signal state transform when either: a pattern confidence threshold is met, or a maximum number of iterations is reached.

16. The wireless communication device of claim 1, wherein the processor is further configured to compare the determined one or more signal patterns with known signal patterns in a pattern recognition database.

17. The wireless communication device according to claim 16, wherein the processor is further configured to update one or more cognitive learning parameters of a trained artificial neural network model when the determined one or more signal patterns are not found in the pattern recognition database.

18. A method for adaptive RF spectrum analysis, the method comprising:
in a wireless communication device:
setting a plurality of operational parameters to process digitized down-converted signals, wherein the digitized down-converted signals are input signals in a plurality of different intermediate frequency bands;
processing the digitized down-converted signals across a plurality of distinct signal domains;
extracting one or more domain-specific features from each signal domain of the plurality of distinct signal domains;
generating a fused feature vector for each intermediate frequency band of the plurality of different intermediate frequency bands from the extracted one or more domain-specific features of each signal domain of the plurality of distinct signal domains;
determining one or more signal patterns based on the generated fused feature vector for each intermediate frequency band of the plurality of different intermediate frequency bands;
generating feedback data based on the determined one or more signal patterns and processing performance metrics of the wireless communication device;
adjusting the plurality of operational parameters based on the generated feedback data; and
detecting a jamming signal and performing a jamming suppression of the detected jamming signal based on the determined one or more signal patterns, the generated feedback data, and a periodic adjustment of the plurality of operational parameters.

19. A computer program product for adaptive RF spectrum analysis, the computer program product comprising a non-transitory computer-readable storage medium having program instructions embodied therewith, the program instructions are executable by a system to cause the system to execute operations, the operations comprising:
setting a plurality of operational parameters to process digitized down-converted signals, wherein the digitized down-converted signals are input signals in a plurality of different intermediate frequency bands;
processing the digitized down-converted signals across a plurality of distinct signal domains;
extracting one or more domain-specific features from each signal domain of the plurality of distinct signal domains;
generating a fused feature vector for each intermediate frequency band of the plurality of different intermediate frequency bands from the extracted one or more domain-specific features of each signal domain of the plurality of distinct signal domains;

determining one or more signal patterns based on the generated fused feature vector for each intermediate frequency band of the plurality of different intermediate frequency bands;

generating feedback data based on the determined one or more signal patterns and processing performance metrics of a wireless communication device;

adjusting the plurality of operational parameters based on the generated feedback data; and detecting a jamming signal and performing a jamming suppression of the detected jamming signal based on the determined one or more signal patterns, the generated feedback data, and a periodic adjustment of the plurality of operational parameters.

* * * * *